US011897692B2

(12) United States Patent
Krishnamoorthy et al.

(10) Patent No.: US 11,897,692 B2
(45) Date of Patent: Feb. 13, 2024

(54) ROBOTIC ORDER CONSOLIDATION USING MODULAR ACTUATED ROTARY PUT-WALL

(71) Applicant: INTELLIGRATED HEADQUARTERS, LLC, Mason, OH (US)

(72) Inventors: Sai Prasanth Krishnamoorthy, Pittsburgh, PA (US); Matthew R. Wicks, Saint Charles, MO (US); Darius M. Scott, Baltimore, MD (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 400 days.

(21) Appl. No.: 17/159,651

(22) Filed: Jan. 27, 2021

(65) Prior Publication Data
US 2022/0234825 A1 Jul. 28, 2022

(51) Int. Cl.
*B65G 1/04* (2006.01)
*B65G 25/06* (2006.01)
*B65G 47/91* (2006.01)

(52) U.S. Cl.
CPC ............ *B65G 1/045* (2013.01); *B65G 25/06* (2013.01); *B65G 47/914* (2013.01); *B65G 2811/0663* (2013.01); *B65G 2812/12* (2013.01); *B65G 2814/0313* (2013.01)

(58) Field of Classification Search
CPC ...... B65G 1/045; B65G 1/133; B65G 1/1373; B65G 1/1378; B65G 47/914; B65G 2811/0663; B65G 2812/12; B65G 2814/0313
See application file for complete search history.

(56) References Cited

U.S. PATENT DOCUMENTS 3,554,391 A * 1/1971 Goodell ................. B65G 1/045
414/331.05
4,389,157 A 6/1983 Bernard et al.
(Continued)

FOREIGN PATENT DOCUMENTS

CH 675113 A5 8/1990
CN 106743019 A 5/2017
(Continued)

OTHER PUBLICATIONS

CN Office Action dated Mar. 27, 2023 for CN Application No. 202210089655, 11 page(s).
(Continued)

*Primary Examiner* — Gene O Crawford
*Assistant Examiner* — Keith R Campbell
(74) *Attorney, Agent, or Firm* — Alston & Bird LLP

(57) ABSTRACT

The apparatus comprises a rotary put wall having a plurality of totes. The apparatus further comprises a vertical reciprocating conveyor (VRC) placed within the rotary put wall. The internal vertical reciprocating conveyor (VRC) comprises a plurality of chutes to receive one or more items from a robotic device. The internal vertical reciprocating conveyor (VRC) is further configured to be rotatable with respect to the rotary put wall and to convey the one or more items into one tote of the plurality of totes of the rotary put wall.

20 Claims, 22 Drawing Sheets

(56) References Cited

U.S. PATENT DOCUMENTS

| | | | |
|---|---|---|---|
| 5,595,263 A * | 1/1997 | Pignataro | B65G 1/1378 |
| | | | 235/383 |
| 5,596,263 A | 1/1997 | Zavis et al. | |
| 9,481,518 B2 * | 11/2016 | Neiser | B65G 1/1373 |
| 10,086,998 B1 * | 10/2018 | Tilekar | B65G 1/1373 |
| 10,906,740 B2 * | 2/2021 | Wagner | B65G 1/1376 |
| 11,180,317 B1 * | 11/2021 | Battles | B25J 15/08 |
| 2004/0069572 A1 * | 4/2004 | Jaspers | B65G 1/045 |
| | | | 186/52 |
| 2017/0369247 A1 | 12/2017 | Bouche et al. | |
| 2018/0057264 A1 * | 3/2018 | Wicks | B65G 1/1376 |
| 2018/0282065 A1 | 10/2018 | Wagner et al. | |
| 2019/0091860 A1 * | 3/2019 | Lipay | G06Q 10/0633 |
| 2019/0329979 A1 | 10/2019 | Wicks et al. | |

FOREIGN PATENT DOCUMENTS

| | | |
|---|---|---|
| CN | 110844429 A | 2/2020 |
| DE | 102015201565 A1 | 8/2016 |
| JP | 2002-128214 A | 5/2002 |

OTHER PUBLICATIONS

European Search Report and Search Opinion received for EP Application No. 22152319.4, dated Oct. 17, 2022, 9 pages.
CN Office Action dated Oct. 16, 2023 for CN Application No. 202210089655, 5 page(s).

* cited by examiner

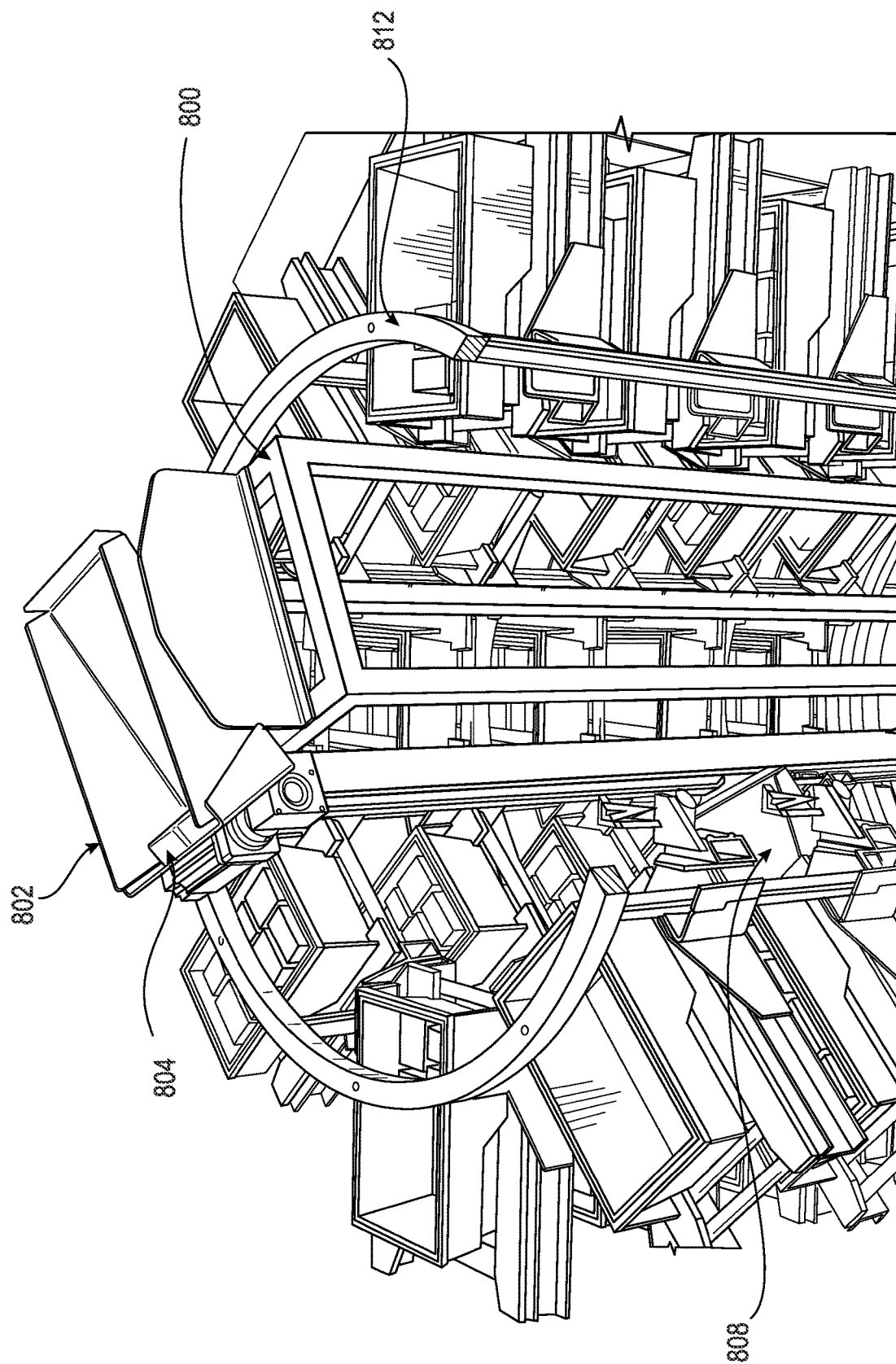

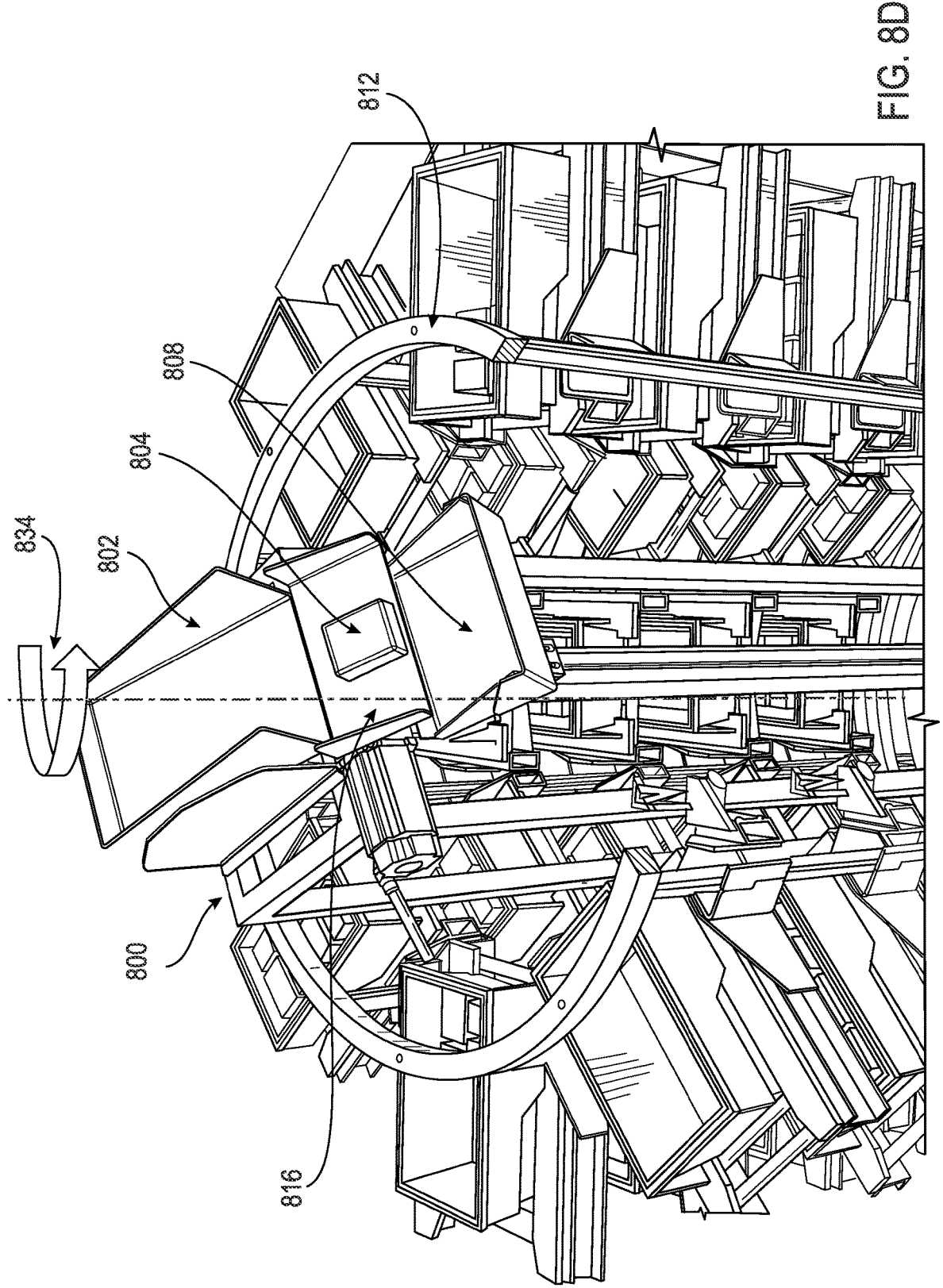

ROBOTIC ORDER CONSOLIDATION USING MODULAR ACTUATED ROTARY PUT-WALL

TECHNICAL FIELD

Example embodiments of the present disclosure relate generally to put-walls in material handling environments and, more particularly, to methods and systems of conveying items using put-walls.

BACKGROUND

Order processing is one of the most important workflows to be considered while operating storage facilities or material handling environments for order fulfillment. Order processing operations generally occur in facilities called "distribution centers". Order processing generally consists of three central sub-processes: (a) Order picking, in which items are collected in a specified quantity before being shipped according to customer orders; (b) Order sorting, in which items are separated based on their respective destinations; and (c) Order consolidation, in which labelled items are assembled into loading units for transportation. Distribution centers utilize a collection of conveyors, put walls, and carts, to move these items around the distribution centers as required to fulfill customer orders. A put wall is a storage system which can handle a large number of orders by consolidating items in a common repository, such as a cubby, a tote, or a carton. For example, items which are part of a single order can be placed in the same cubby and later processed to be shipped together from the distribution center.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIGS. 8B-8G illustrate movement of a dumper chute of the internal vertical reciprocating conveyor within the rotary out wall carousel;

DETAILED DESCRIPTION OF THE INVENTION

Figure 1:
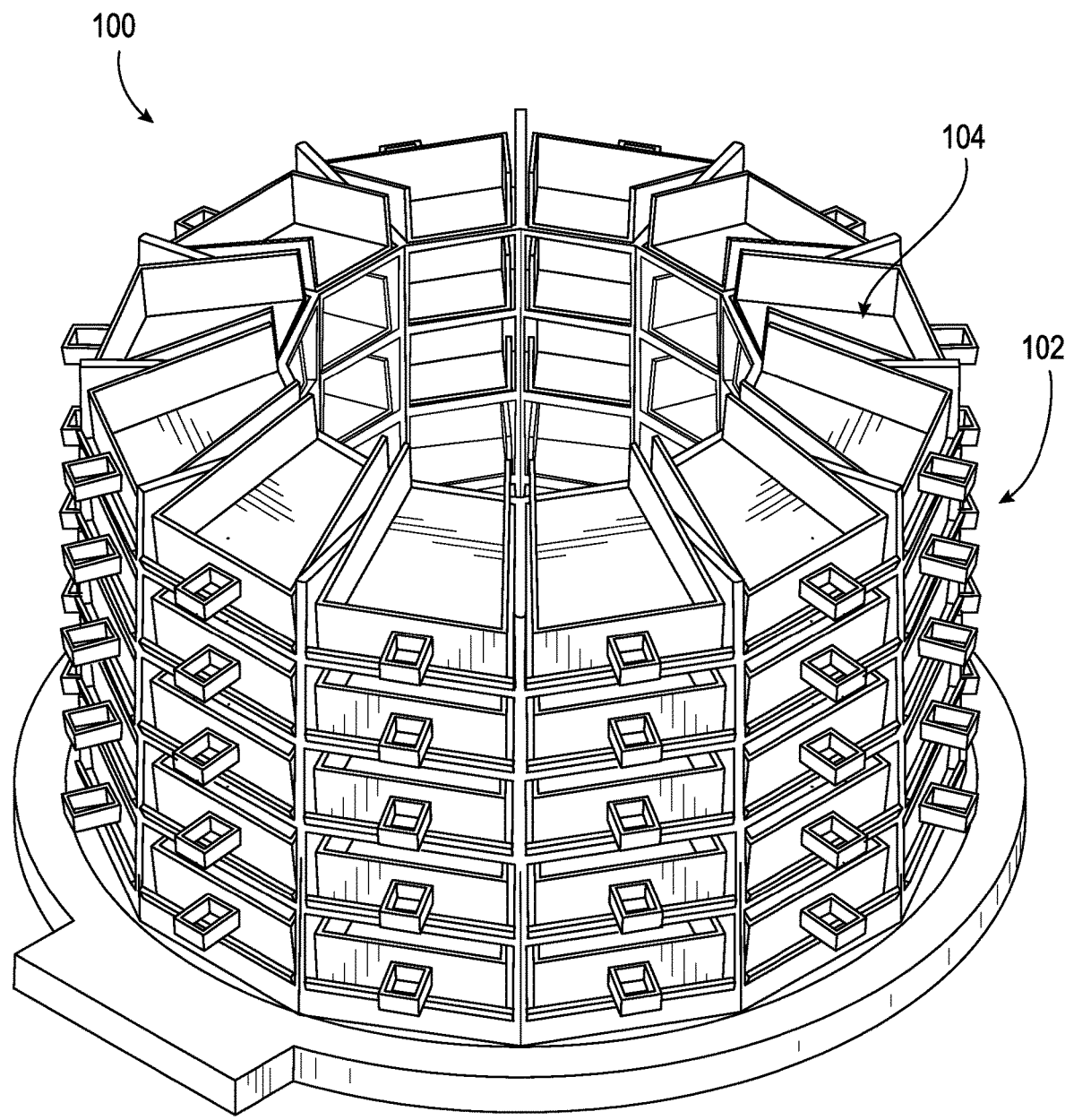
FIG. 1 illustrates an exemplary perspective view of a rotary put wall, according to one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details.

Various embodiments disclosed herein provide for a rotary put wall that can comprises a plurality of totes that are designed to hold items related to a specific customer order. The rotary put wall can receive one or more items to fulfil a customer order from a donor tote of a plurality of donor totes. The donor tote can be present on a conveyor which transports a plurality of donor totes transporting one or more items. An item can be picked from the donor tote and placed in a tote of the plurality of totes of the rotary put wall. This process can be repeated till all items associated with the customer order have been placed in the tote. Upon completion of the customer order, the filled tote can be dumped into an empty order tote on an outfeed conveyor. The filled order tote is then dispatched away on the outfeed conveyor for further processing. The small footprint achieved by having a rotary put wall with a compact layout and simple mechanism offers a simple and space-optimized method of conveying items in distribution centers, thus increasing overall efficiency and reducing operational cycle time.

In an embodiment, the item can be picked from the donor tote by a first robotic device such as a robotic manipulator having end effectors such as vacuum cups or robotic fingers. In an embodiment, the item can be picked from the donor tote by a human operator.

In an embodiment, the item can be picked by the first robotic device from the donor tote and transferred to a second robotic device. The second robotic device can be present within the rotary put wall and can be configured such that the second robotic device and the rotary put wall are rotatable with respect to each other. The second robotic device can convey the received item to a consolidation zone in the rotary put wall. This process can be repeated for all the items associated with a customer order. A third robotic device can then pick the items associated with the customer order from the rotary put wall and transfer the items to an empty tote on an outfeed conveyor.

In an embodiment, the second robotic device can be rotatable, and the rotary put wall can be stationary.

In an embodiment, the second robotic device can be stationary, and the rotary put wall can be rotatable.

In an embodiment, the empty tote can be one order tote of a plurality of order totes on the outfeed conveyor.

In an embodiment, the third robotic device can be a robotic manipulator having end effectors such as robotic fingers or vacuum cups. In yet another embodiment, the third robotic device can be a human operator.

In an embodiment, the rotary put wall can be a modular actuated rotary put wall.

In an embodiment, a dual conveyor system can be used to transport the donor tote of the plurality of donor totes and the order tote of the plurality of order totes such that the donor tote of the plurality of donor totes can be transported on an upper conveyor and the order tote of the plurality of order totes can be transported on a lower conveyor of the dual conveyor system or vice versa.

In an embodiment, the rotary put wall can be a rotary put wall carousel which can comprise a plurality of totes. One or more vertical reciprocating conveyors can be present external to the rotary put wall carousel to transport empty and filled totes to and away from the modular rotary put wall. A vertical reciprocating conveyor can be present within the rotary put wall and can comprise one or more of chutes to receive one or more items picked from a donor tote. The internal vertical reciprocating conveyor and the rotary put wall carousel can be configured to rotate with respect to each other such that the internal vertical reciprocating conveyor can convey an item placed in one chute of the plurality of chutes to one of the plurality of totes of the rotary put wall carousel. The internal vertical reciprocating conveyor can be positioned within the rotary put wall carousel such that the internal vertical reciprocating conveyor can access the plurality of totes of the rotary put wall carousel from inside of the rotary put wall carousel.

In an embodiment, a robotic device such as a robotic manipulator can be used to pick the item from the donor tote and place the item in the one chute of the plurality of chutes of the internal vertical reciprocating conveyor.

In an embodiment, the internal vertical reciprocating conveyor can comprise a dumper chute mounted to the internal vertical reciprocating conveyor and a collection chute mounted at the top of the internal vertical reciprocating conveyor. The collection chute can receive the item from the robotic manipulator. The internal vertical reciprocating conveyor can then rotate toward an order position such that the item in the collection chute can be conveyed to the dumper chute. The dumper chute mounted to the internal vertical reciprocating conveyor can then be actuated to be elevated to the top of the internal vertical reciprocating conveyor to receive the item from the collection chute. The dumper chute can be actuated such that the dumper chute is lowered to a designated put location for the item. Once the item is placed in the designated put location, the item can then be released into a tote of the plurality of totes of the rotary put wall carousel. The tote of the plurality of totes of the rotary put wall carousel carrying the item can then be dispatched to an outfeed conveyor for further processing.

In an embodiment, the rotary put wall carousel can be a modular actuated rotary put wall carousel.

FIG. 1 illustrates an exemplary perspective view of a rotary put wall 102 in a system environment 100 according to one or more embodiments described herein. The rotary put wall 102 can comprise a plurality of totes, such as 104 to receive items associated with one or more customer orders. The rotary put wall 102 can be cylindrical in shape and comprise a plurality of consolidation zones for consolidating the one or more customer orders. In some embodiments, the rotary put wall 102 can comprise a plurality of shelves or levels in which the plurality of totes can be placed. In some embodiments, the rotary put wall 102 can have other polygonal designs such as a pentagonal shape, a hexagonal shape, and so on. In some other embodiments, the rotary put wall can comprise of a plurality of cubbies or chutes to receive items. In yet some other embodiments, the rotary put wall 102 can be modular in structure such that the rotary put wall 102 can be expanded in a vertical and a horizontal direction. In yet some other embodiments, Pick-to-Light (PTL) devices, such as light-emitting devices (LEDs) can be installed in each tote of the plurality of totes of the rotary put wall 102 to indicate that the one or more customer orders have been completed. In yet some other embodiments, each tote of the plurality of totes can comprise one or more of an audio communication means, a visual communication means, and a keypad to indicate that the one or more customer orders have been completed. In some embodiments, a controller can control the operation of one or more of the Pick-to-Light (PTL) devices, the audio communication means, the visual communication means, and the keypad. The controller can be connected to the rotary put wall 102 using wired or wireless connection. In some embodiments, the containers (e.g. 104) can be wedge shaped as shown in FIG. 1. In other embodiments, the containers can be rectangular shaped as shown in FIGS. 8A-8G.

Figure 2:
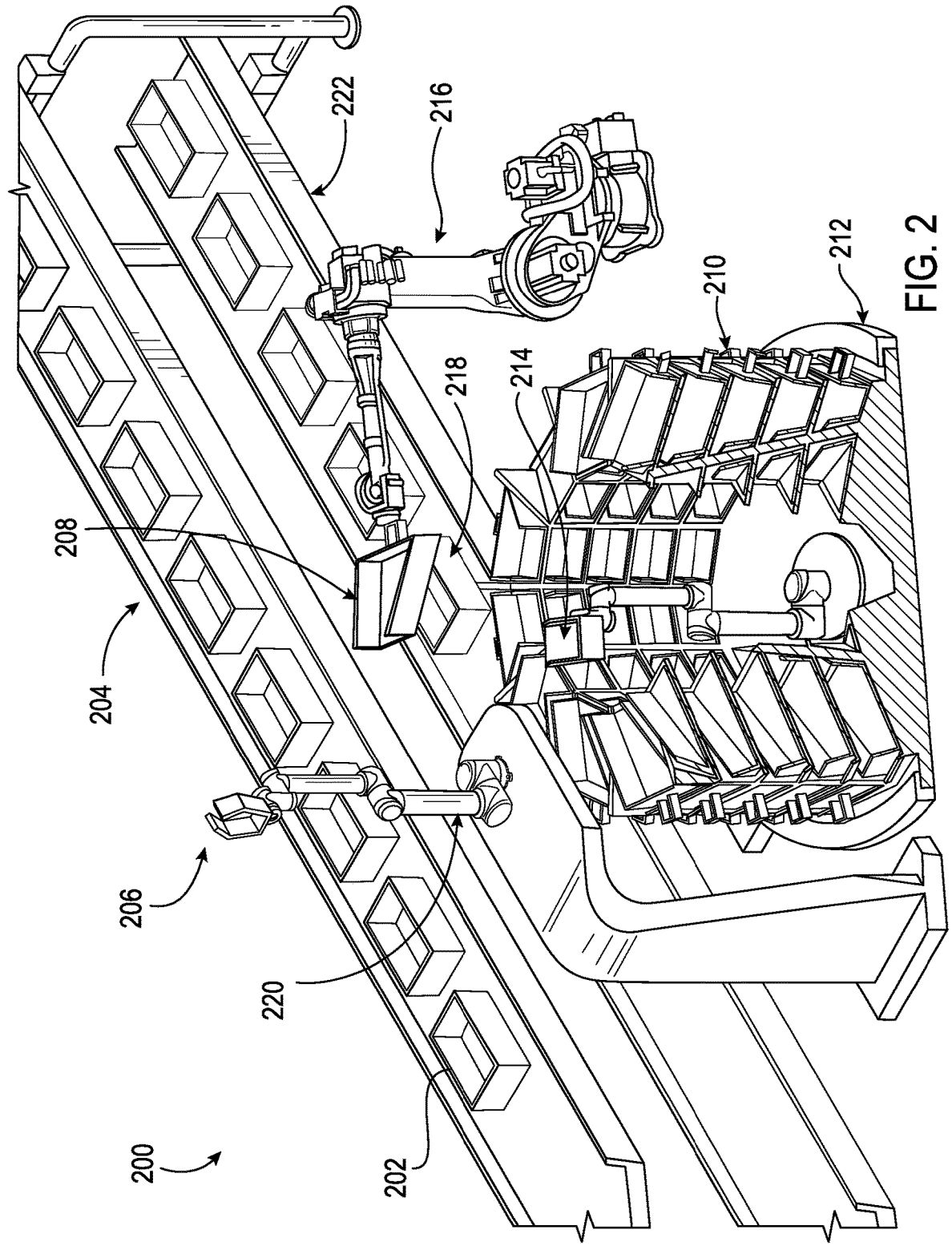
FIG. 2 illustrates a system environment having the rotary put wall, a first robotic device, a second robotic device and a third robotic device, according to one or more embodiments described herein.

FIG. 2 illustrates a system environment 200 having the rotary put wall 212, a first robotic device 220, a second robotic device 214 and a third robotic device 216 according to one or more embodiments described herein. The rotary put wall 212 comprises a plurality of chutes, such as 208 and 210 to receive items. The system environment 200 further comprises an upper conveyor 204 to transport a tote 202 of a plurality of totes. The tote 202 can be a donor tote. A lower conveyor 222 can transport a tote 218 of a plurality of totes. The tote 218 can be an order tote to transport items based on one or more customer orders for further processing.

The upper conveyor 204 can transport totes such as tote 202 which carry one or more items to be sorted according to customer orders. The first robotic device 220 can pick an item of one or more items associated with a customer order from the tote 202. The first robotic device 220 can be a robotic manipulator having an end effector 206 to pick the item. The end effector 206 of the robotic device 220 can be robotic fingers, vacuum cups, electromagnetic clamp, or any other form of vacuum, pneumatic, electromagnetic gripping means. The end effector 206 can then transfer the item to the second robotic device 214. The second robotic device 214 can have a chute to receive the item transferred by the first robotic device 220. The second robotic device 214 can then convey the item into a chute 208 present in a consolidation zone of the plurality of consolidation zones of the rotary put wall 212. The process of picking items from the totes of the one or more totes of the upper conveyor 204 and placing the items in the chute 208 of the one or more chutes of the rotary put wall 212 can be repeated till all items associated with the customer order are placed in the chute 208.

Upon completion of the customer order, a third robotic device 216 can pick the chute 208 carrying the one or more items associated with the customer order from the consolidation zone of the rotary put wall 212. The third robotic device 216 can then transfer the one or more items present in the chute 208 to a tote 218 of the plurality of totes present on the lower conveyor 222. The filled tote 218 containing the one or more items associated with the customer order can then be dispatched away for further processing.

In an example embodiment, the upper conveyor 204 and the lower conveyor 222 can be conveyor belts supported by a series of idler rollers or roller conveyors comprising a bed of parallel rollers positioned adjacent to each other.

In an example embodiment, actions performed by the first robotic device 220 and the third robotic device 216 can also be performed by a human operator.

Figure 3:
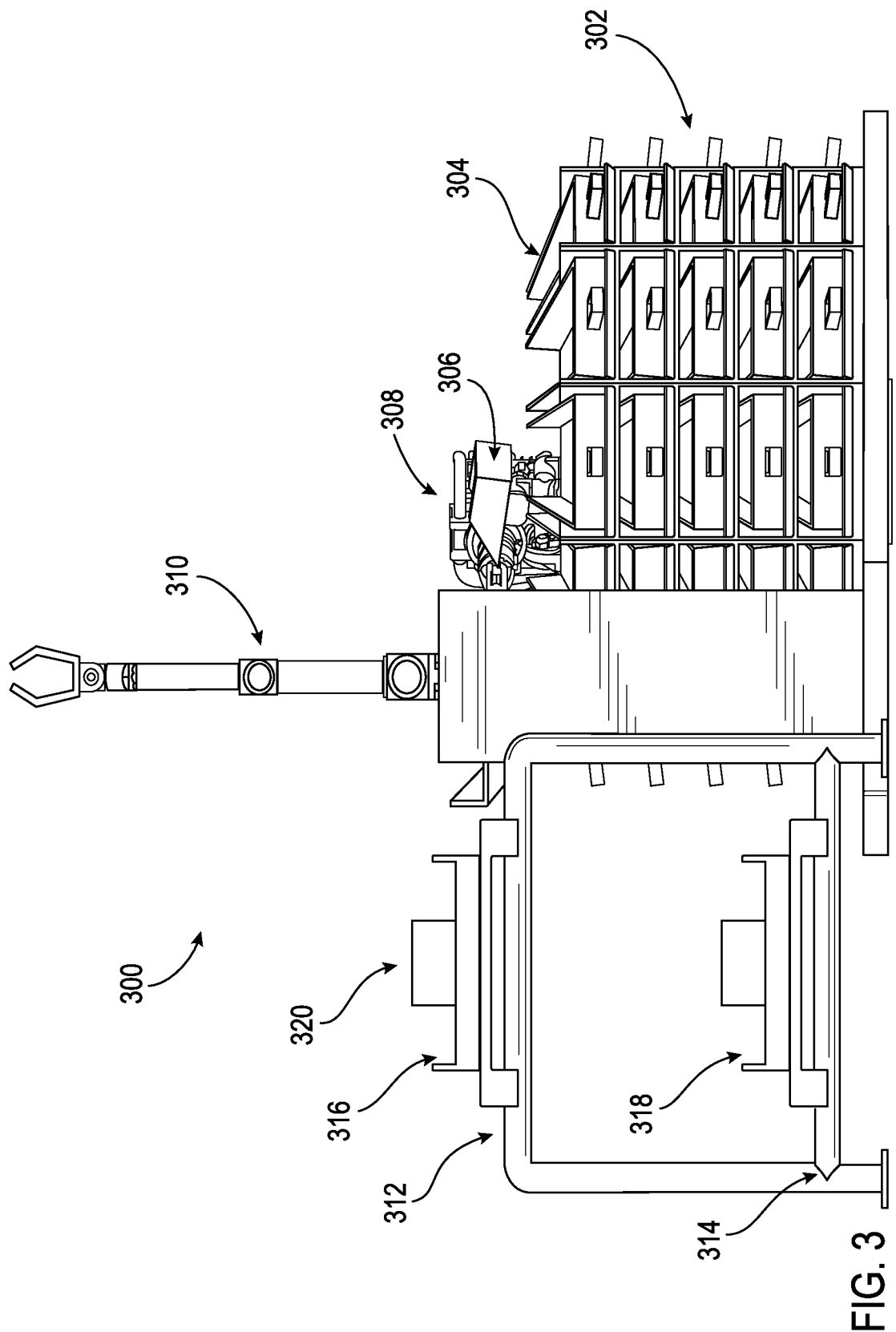
FIG. 3 illustrates a side view of the rotary put wall, according to one or more embodiments described herein.

FIG. 3 illustrates a side view of the rotary put wall 302 in a system environment 300 according to one or more embodiments described herein. The system environment 300 can comprise an upper conveyor 312 to transport a tote 316 of a plurality of totes carrying an item 320. The system environment 300 can further comprise a first robotic manipulator 310 having an end effector to pick the item 320 from the tote 316 and place the item 320 in a chute of a second robotic manipulator 306. The second robotic manipulator 306 can place the item 320 in a tote 304 of the plurality of totes of the rotary put wall 302. Upon completion of a customer order associated with the item 320, a third robotic manipulator 308 can pick the tote 304 and transfer the item 320 in a tote 318 of a plurality of totes in a lower conveyor 314 to be dispatched for further processing.

Figure 4:
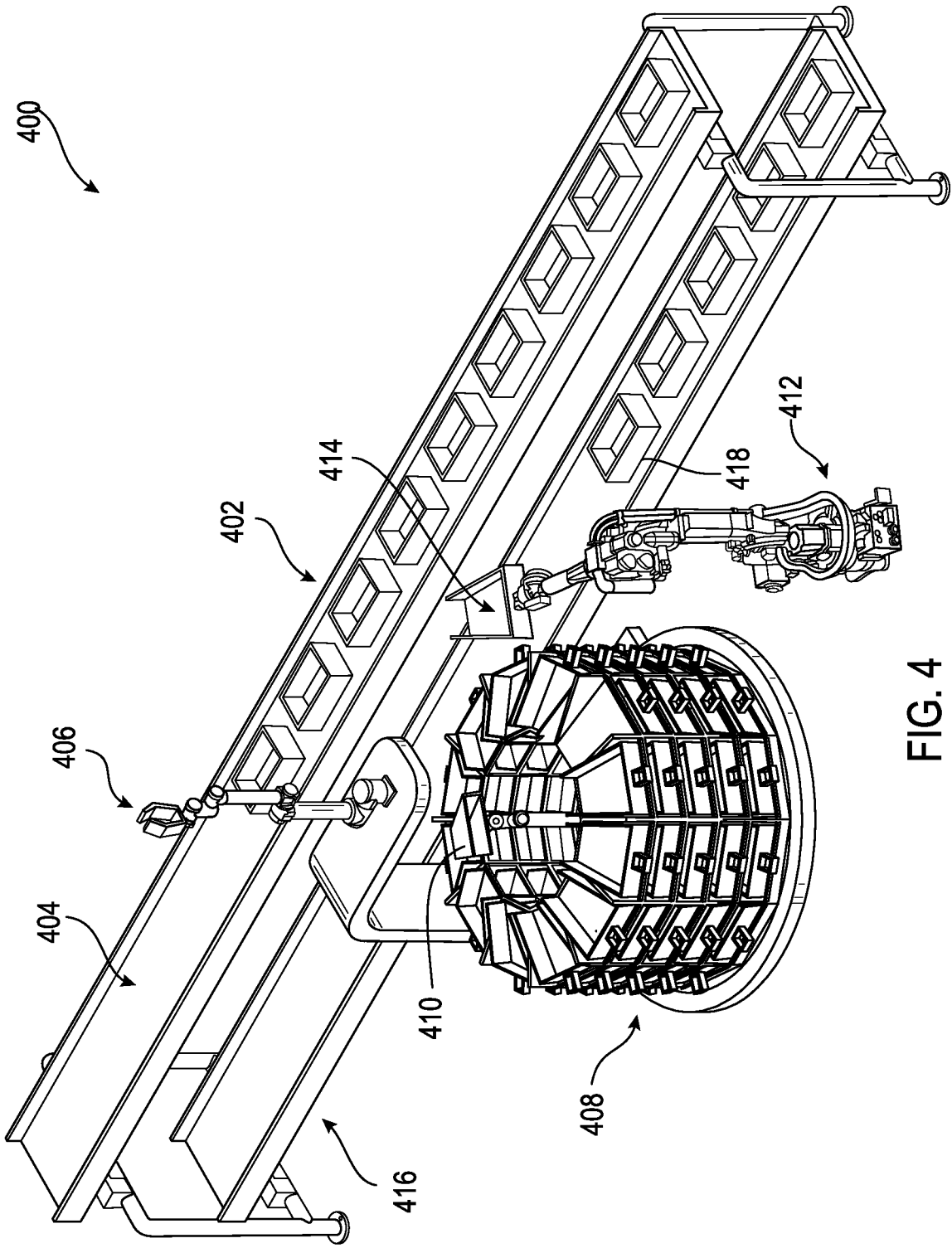
FIG. 4 illustrates a top view of the rotary put wall, according to one or more embodiments described herein.

FIG. 4 illustrates a top view of the rotary put wall 408 having a tote 414 of a plurality of totes in a material handling environment 400. The material handling environment 400 can comprise an upper conveyor 404 for transporting a tote such as tote 402 of a plurality of totes, a first robotic manipulator 406, a second robotic manipulator 410, a third robotic manipulator 412 and a lower conveyor 416 for conveying a tote 418 of a plurality of totes, wherein the tote 418 can transport one or more items associated with a customer order.

Figure 5:
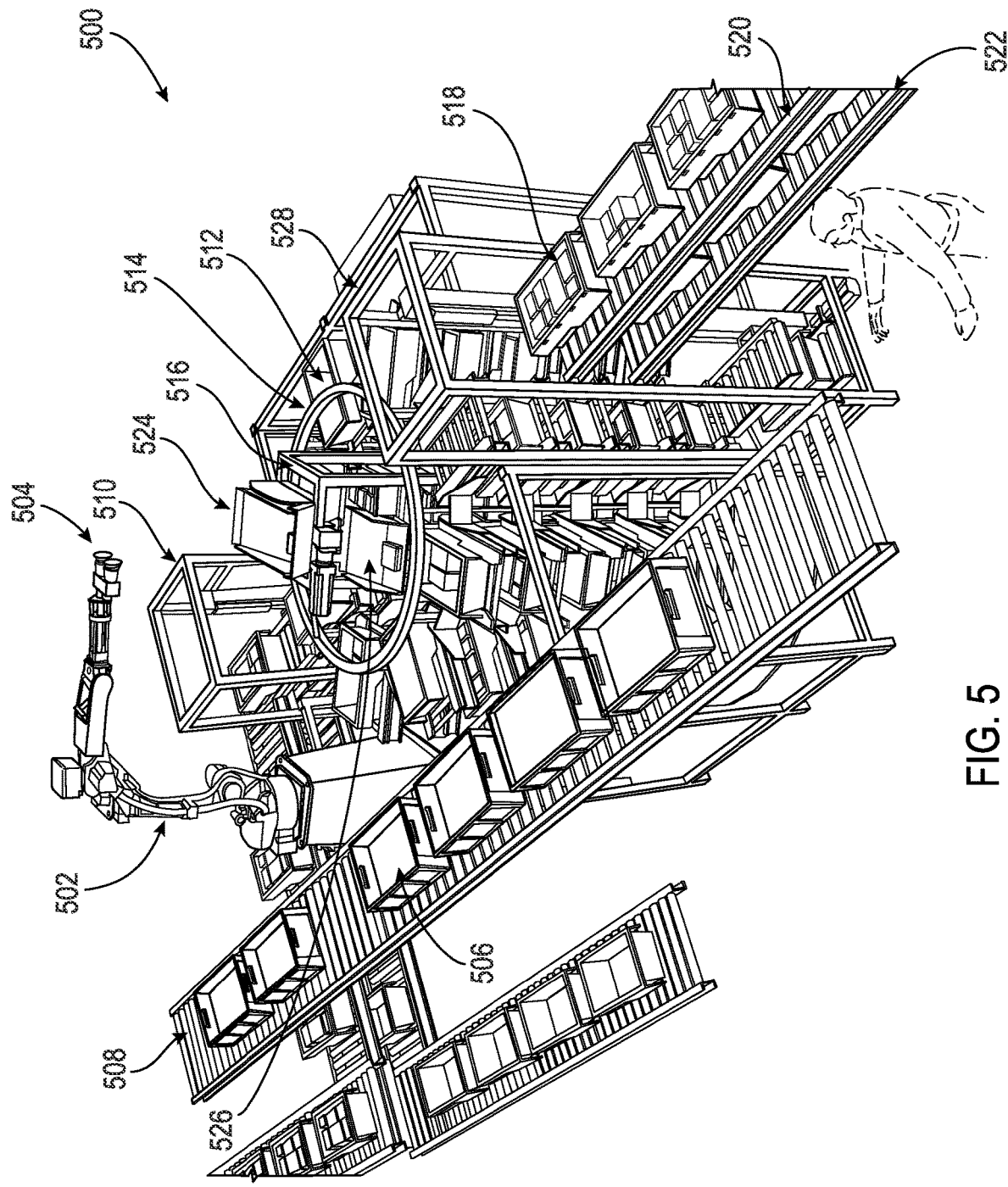
FIG. 5 illustrates an exemplary perspective view of a rotary put wall carousel, according to one or more embodiments described herein.

FIG. 5 illustrates a perspective view of a rotary put wall carousel 514 comprising a plurality of totes such as 512 to receive items in a material handling environment 500, in accordance with various aspects and embodiments of the subject disclosure. The rotary put wall carousel 514 can comprise a plurality of shelves or levels to support the plurality of totes such as a tote 512. The rotary put wall carousel 514 can be cylindrical in shape. In some example embodiments, the rotary put wall carousel 514 can have other polygonal designs such as a pentagonal shape, a hexagonal shape, and so on. The rotary put wall carousel 514 can comprise a vertical reciprocating conveyor (VRC) 516 within the rotary put wall carousel 514. The internal vertical reciprocating conveyor (VRC) 516 can comprise a plurality of chutes or totes to receive items, such as a collector chute 524 and a dumper chute 526. The material handling environment 500 further comprises external vertical reciprocating conveyors 510 and 528, a first roller bed 508 which transports a plurality of totes such as tote 506, a second roller bed 520 which receives a tote 518 from the external vertical reciprocating conveyor 528, a third roller bed 522 and a robotic device 502 having an end effector 504.

The first roller bed 508 can transport a tote 506 of a plurality of totes which can comprise one or more items to be consolidated in accordance with one or more customer orders. The robotic device 502 having the end effector 504 can pick an item from the tote 506 to place the item in the collector chute 524 of the internal vertical reciprocating conveyor (VRC) 516. The end effector 504 of the robotic device 502 can be a plurality of vacuum cups, robotic fingers, electromagnetic clamps, or any other form of vacuum, pneumatic, electromagnetic gripping means for robotic devices. The collector chute 524 can be mounted at the top of the internal vertical reciprocating conveyor (VRC) 516 to receive the item from the end effector 504 of the robotic device 502. The dumper chute 526 of the internal vertical reciprocating conveyor (VRC) 516 can be mounted to the internal vertical reciprocating conveyor (VRC) 516 frame such that the dumper chute 526 can be rotatable about the axis of the internal vertical reciprocating conveyor (VRC) 516. The dumper chute 526 can be actuated such that the dumper chute 526 can be moved up and down across the frame of the internal vertical reciprocating conveyor (VRC) 516. When the item is present in the collector chute 524, the dumper chute 526 can be actuated such that the dumper chute 526 is present at the top of the internal vertical reciprocating conveyor (VRC) 516 to receive the item from the collector chute 524.

When the item is received by the dumper chute 526, the dumper chute 526 can be actuated such that the dumper chute 526 can be lowered to a designated put location for the item in the tote 512. The item can then be released into the tote 512 by the dumper chute 526. When all items related to the customer order have been placed in the tote 512, the tote 512 can be released onto the second roller bed 520. The second roller bed 520 can be used to transport totes such as 512 and 518, which can comprise one or more complete customer orders.

Figure 6:
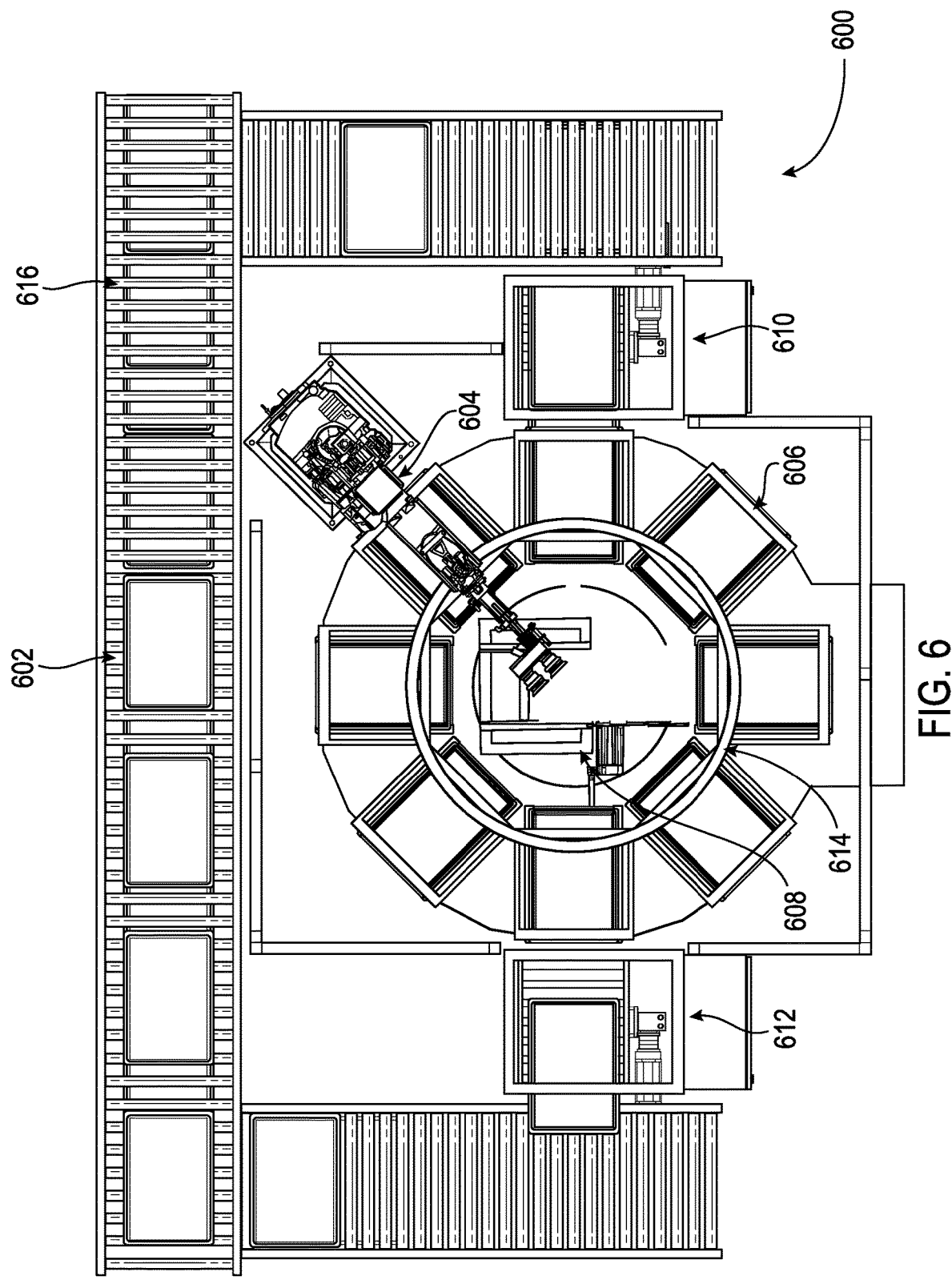
FIG. 6 illustrates a top view of a rotary put wall carousel, according to one or more embodiments described herein.

FIG. 6 illustrates a top view of a rotary put wall carousel 606 in a material handling environment 600. The material handling environment 600 can further comprise a roller conveyor 616 for transporting a tote 602 of a plurality of totes, external vertical reciprocating conveyors (VRCs) 612 and 610, a robotic device 604 and an internal vertical reciprocating conveyor 608. The rotary put wall carousel 606 can comprise a cylindrical frame 614 having a plurality of shelves or levels to support a plurality of chutes.

Figure 7A:
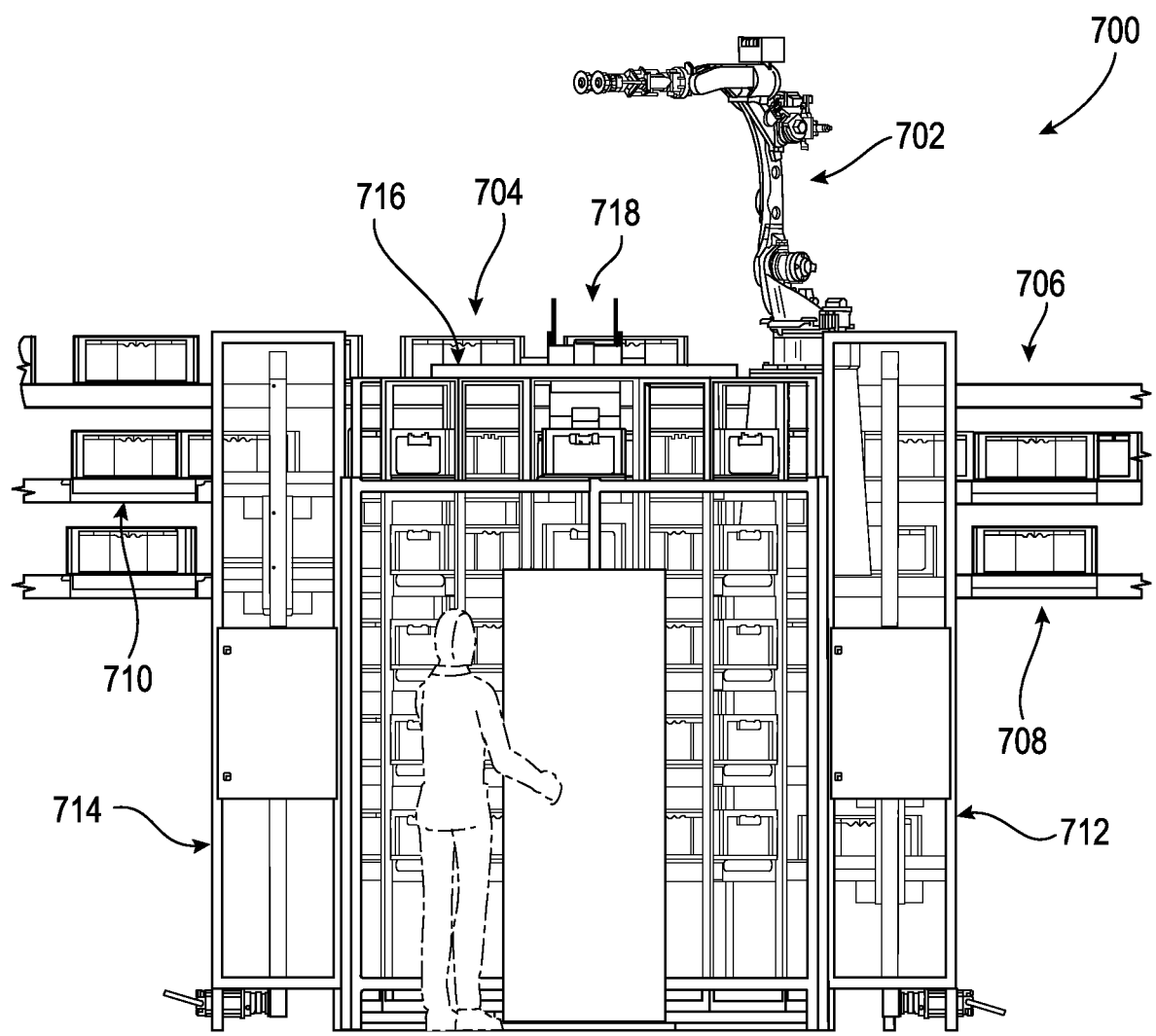
FIG. 7A illustrates a front view of the rotary put wall carousel, according to one or more embodiments described herein.
Figure 7B:
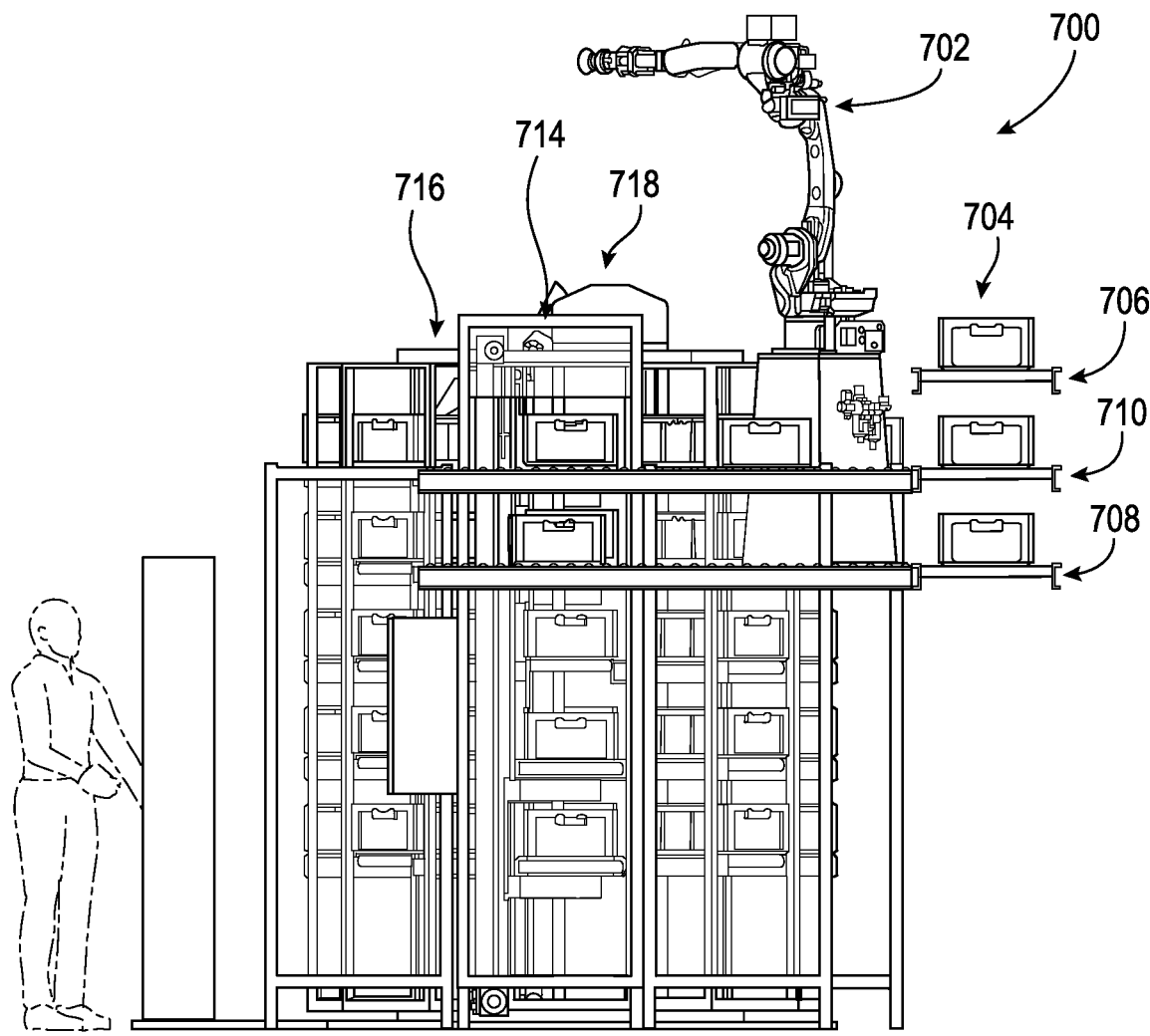
FIG. 7B illustrates a side view of the rotary put wall carousel, according to one or more embodiments described herein.

FIGS. 7A and 7B illustrate a front view and a side view of a rotary put wall carousel 716 having a plurality of chutes in a material handling environment 700. The material handling environment 700 can further comprise a tote 704 of a plurality of totes which can be transported by a conveyor system comprising an upper conveyor 706, a middle conveyor 710, a lower conveyor 708. The material handling environment can further comprise an external vertical reciprocating conveyors (VRCs) 712 and 714, a robotic device 702 and an internal vertical reciprocating conveyor 718.

Figure 8A:
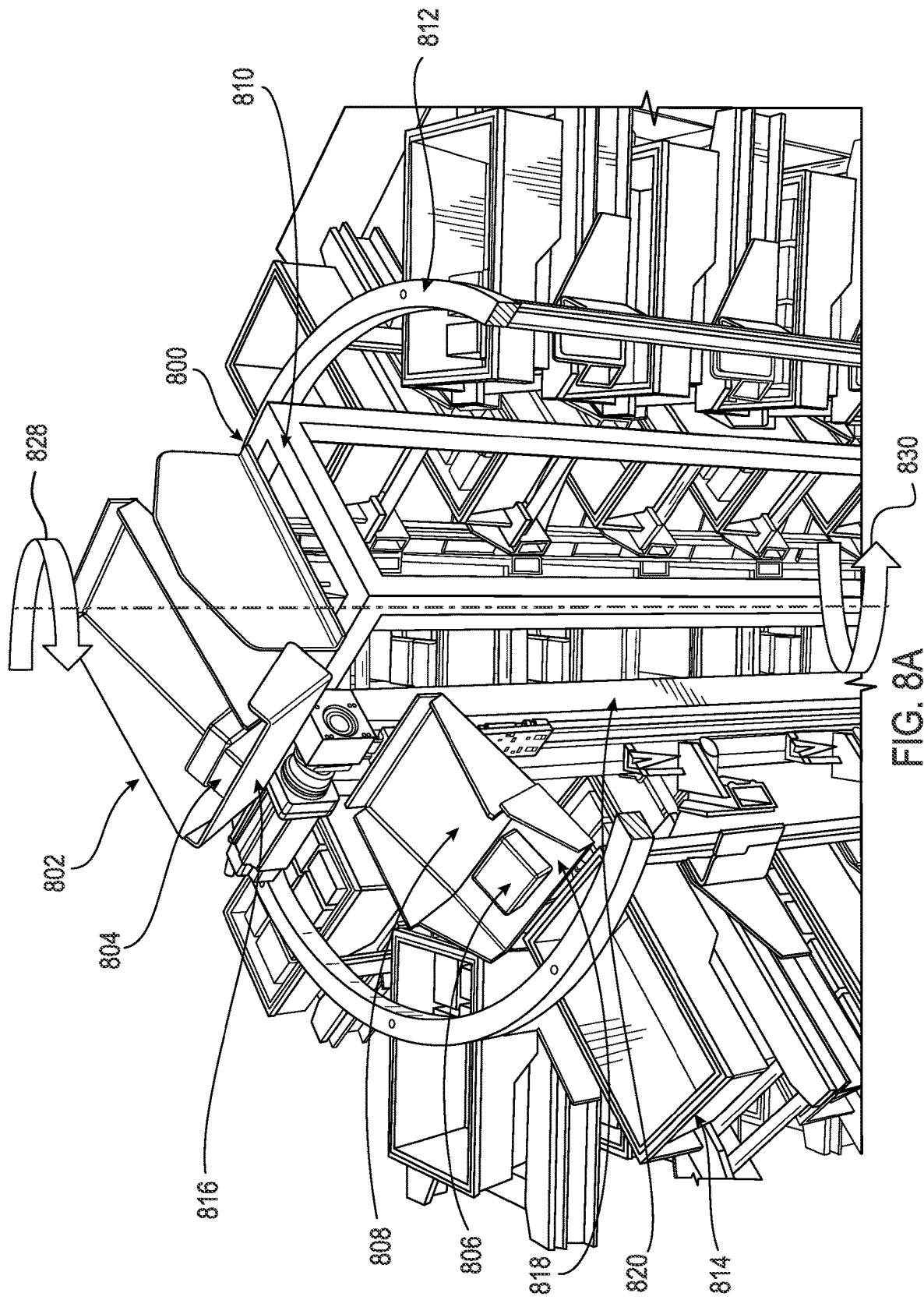
FIG. 8A illustrates an exemplary cutaway view of an internal vertical reciprocating conveyor within the rotary out wall carousel.

FIG. 8A illustrates an exemplary cutaway view of an internal vertical reciprocating conveyor 800 within a rotary put wall carousel 812 having a plurality of totes such as 814. The internal vertical reciprocating conveyor 800 can comprise a frame 810 and a plurality of chutes such as a collection chute 802 and a dumper chute 808. The collection chute 802 can receive items such as 804 from a robotic device or a human operator. The collection chute 802 can transfer items such as 806 to the dumper chute 808. The items 804 and 806 can indicate items associated with a picking order for a customer. Further, the collection chute 802 and the dumper chute 808 can have release doors such as 816 and 818 respectively. The internal vertical reciprocating conveyor 800 can rotate independently with respect to the rotary put wall carousel 812, as can be indicated by arrows 828 and 830. The dumper chute 808 can be mounted on a lift axis 820 of the internal vertical reciprocating conveyor 800. Using the lift axis 820, the dumper chute 808 can be actuated to move in the upward direction and the downward direction along the axis of the internal vertical reciprocating conveyor 800 to transfer items from the collection chute 802 to a designated tote of the plurality of totes of the rotary put wall carousel 812. In an embodiment, the internal vertical reciprocating conveyor 808 can be rotatable and the rotary put wall carousel 812 can be stationary. In yet another embodiment, the internal vertical reciprocating conveyor 808 can be stationary and the rotary put wall carousel 812 can be rotatable.

FIG. 8B illustrates an initial position of the dumper chute 808 of the internal vertical reciprocating conveyor 800 within the rotary put wall carousel 812. The item 804 can be received by the collector chute 802 from a tote of a plurality of totes which can be present on a conveyor system.

Figure 8C:
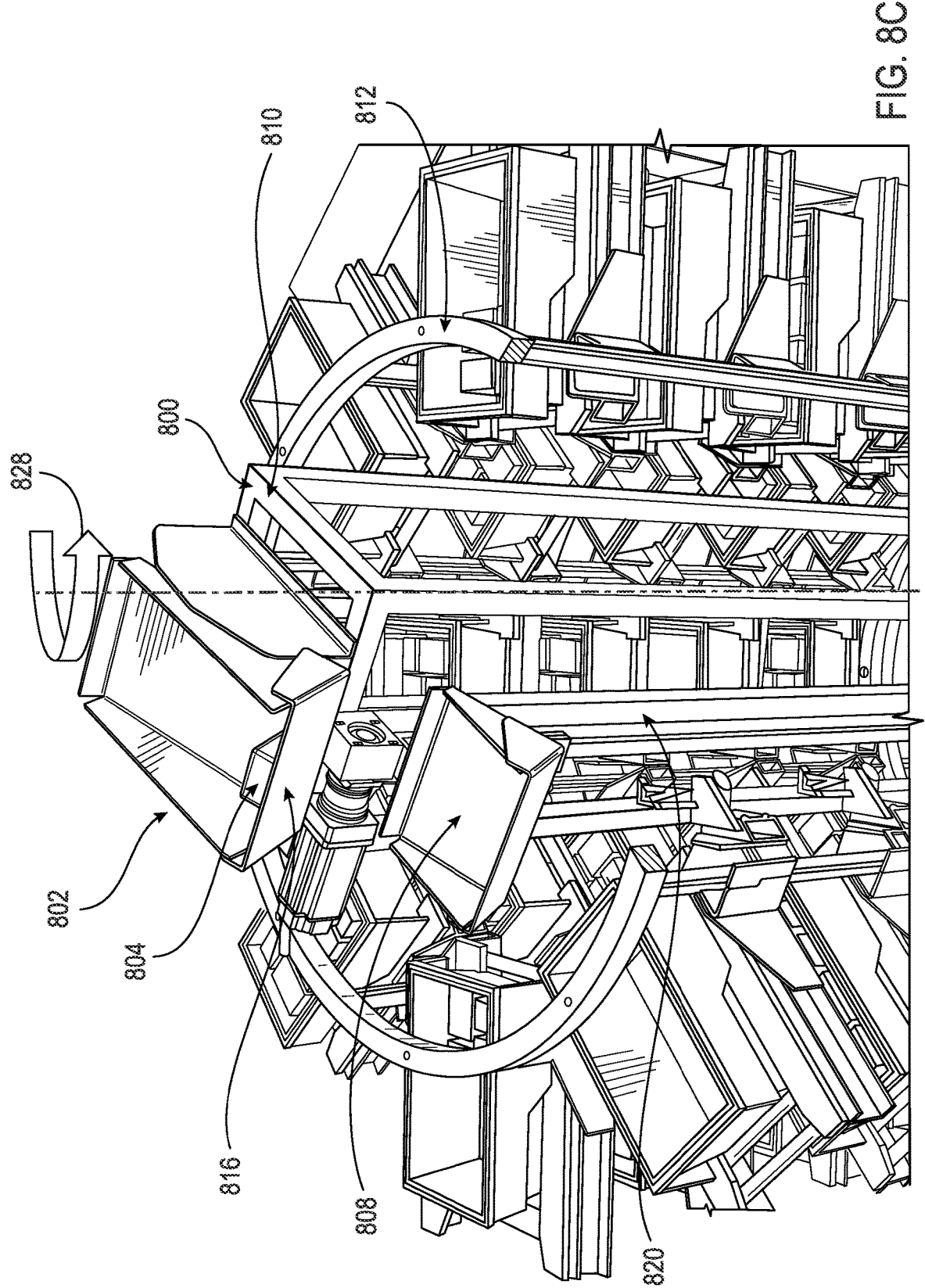

FIG. 8C illustrates an updated position of the dumper chute 808 of the internal vertical reciprocating conveyor 800 within the rotary put wall carousel 812. The dumper chute 808 can be actuated to move upwards (as indicated by the arrow) to the top of the internal vertical reciprocating conveyor 800 using the lift axis 820. Using the release door 816, the collection chute 802 can transfer the item 804 to the dumper chute 808. Further, the internal vertical reciprocating conveyor 800 can be rotated while the dumper chute 808 ascends to the top of the internal vertical reciprocating conveyor 800, as is indicated by the arrow 832.

FIG. 8D illustrates that the internal vertical reciprocating conveyor 800 can continue to rotate (as is indicated by the arrow 834) while the release door 816 of the collection chute 802 can be opened so that the item 804 can be transferred to the dumper chute 808.

Figure 8E:
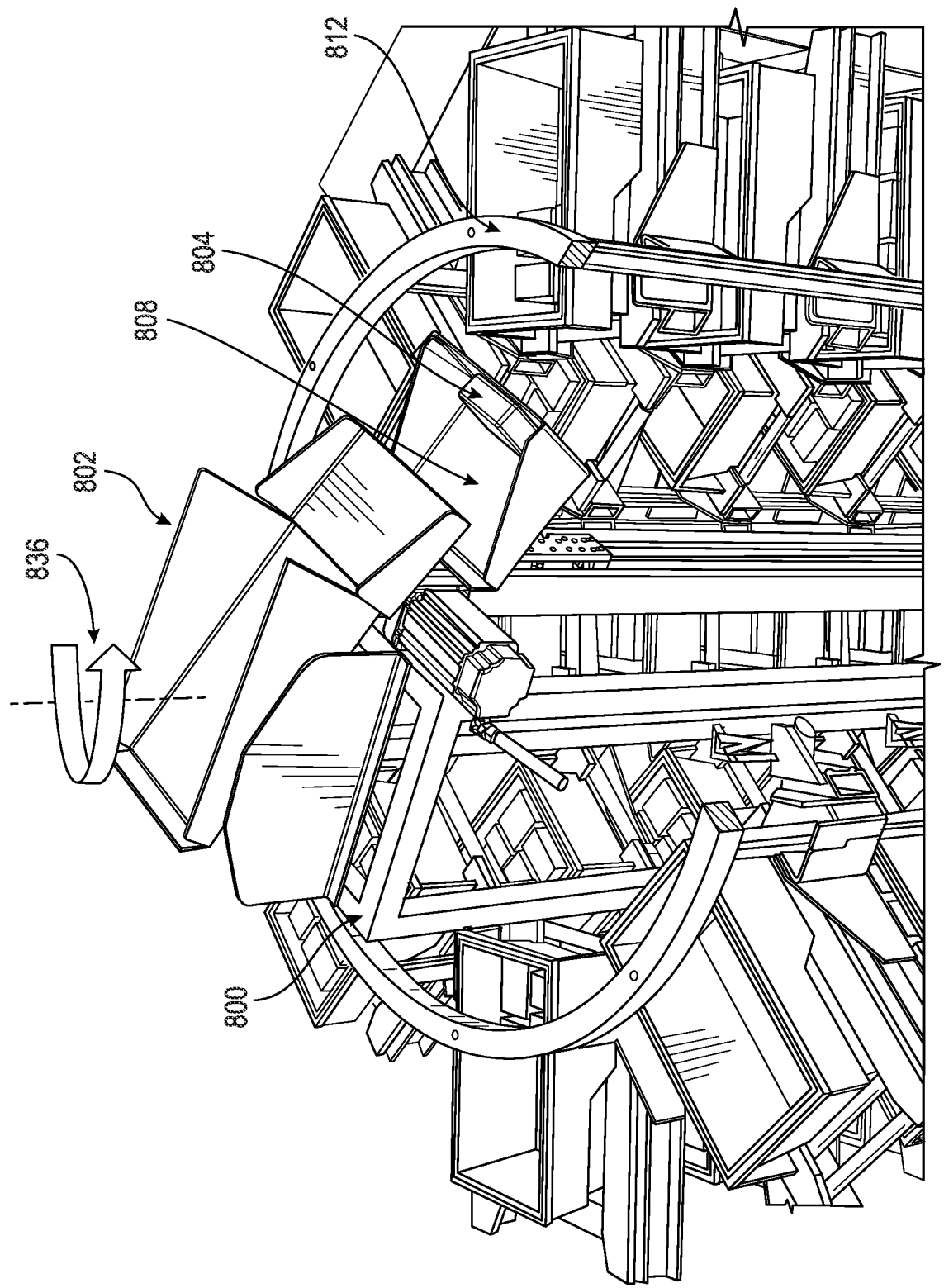

FIG. 8E illustrates that the internal vertical reciprocating conveyor 800 can rotate towards a destination tote of the plurality of totes of the rotary put wall carousel 812, as is indicated by the arrow 836. Further, the dumper chute 808 can receive the item 804 from the collection chute 802.

Figure 8F:
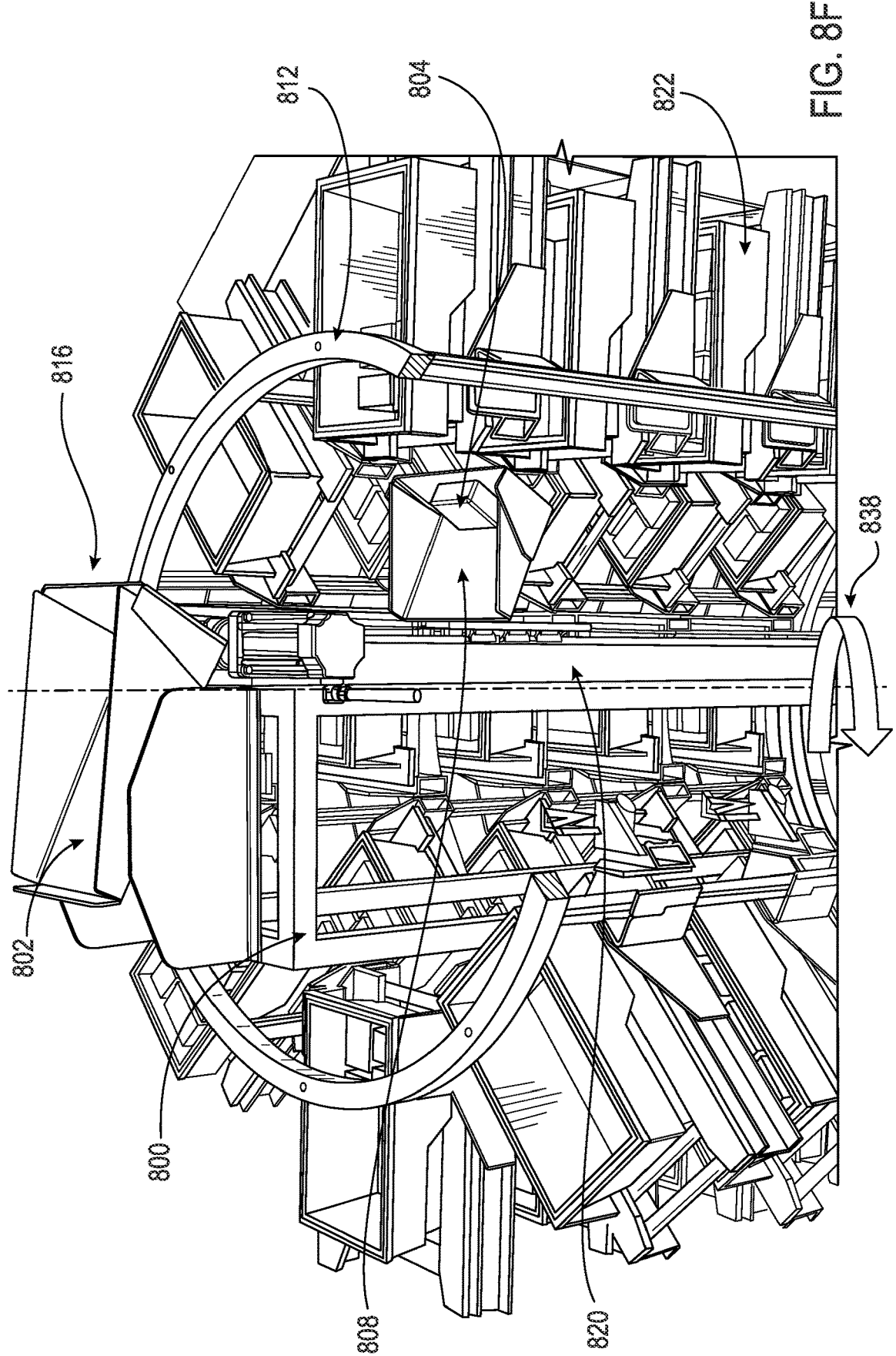

FIG. 8F illustrates that the rotary put wall carousel 812 can rotate independently with respect to the internal vertical reciprocating conveyor 800 so that the internal vertical reciprocating conveyor 800 can be in an optimized position with respect to a designated tote 822 of the plurality of totes of the rotary put wall carousel 812 to receive the item 804, as is indicated by the arrow 838. Further, the dumper chute 808 can descend along the lift axis 820 to transfer the item 804 to the designated tote 822. The release door 816 of the collection chute 802 can be placed in a closed position to receive a next item from a robotic device or a human operator.

Figure 8G:
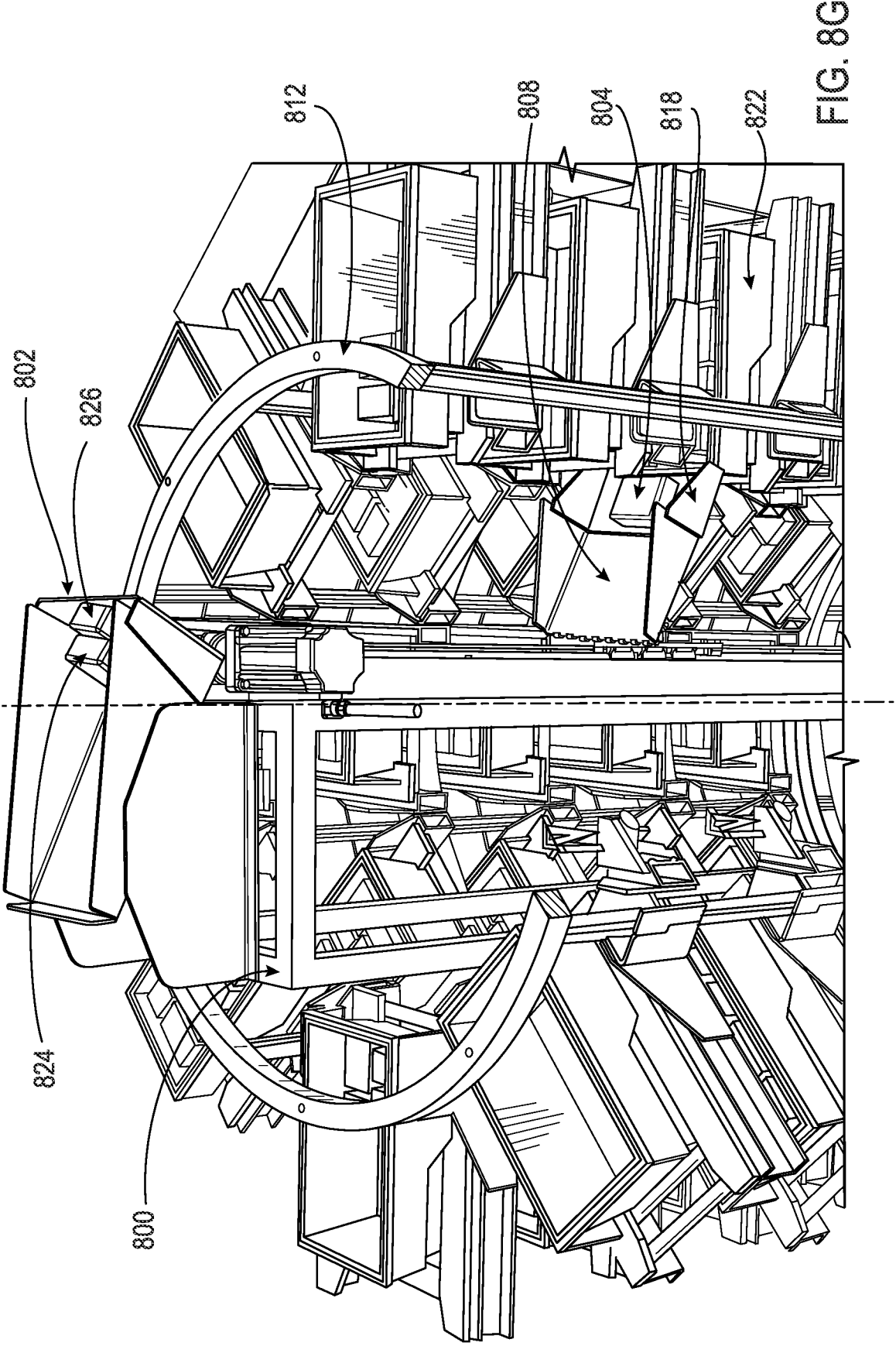

FIG. 8G illustrates that the dumper chute 808 can open the release door 818 of the dumper chute 808 to transfer the item 804 to the designated tote 822. The collection chute 802 of the internal vertical reciprocating conveyor 800 can receive items such as 824 and 826 from the robotic device or the human operator to transfer to the dumper chute 808.

FIGS. 9A-9F illustrate movement of an item 908 from a collection chute 910 of an internal vertical reciprocating conveyor (VRC) 912 to a dumper chute 914, and then to a designated tote 916 of the plurality of totes of the rotary put wall carousel 904 in a material handling environment 900.

Figure 9A:
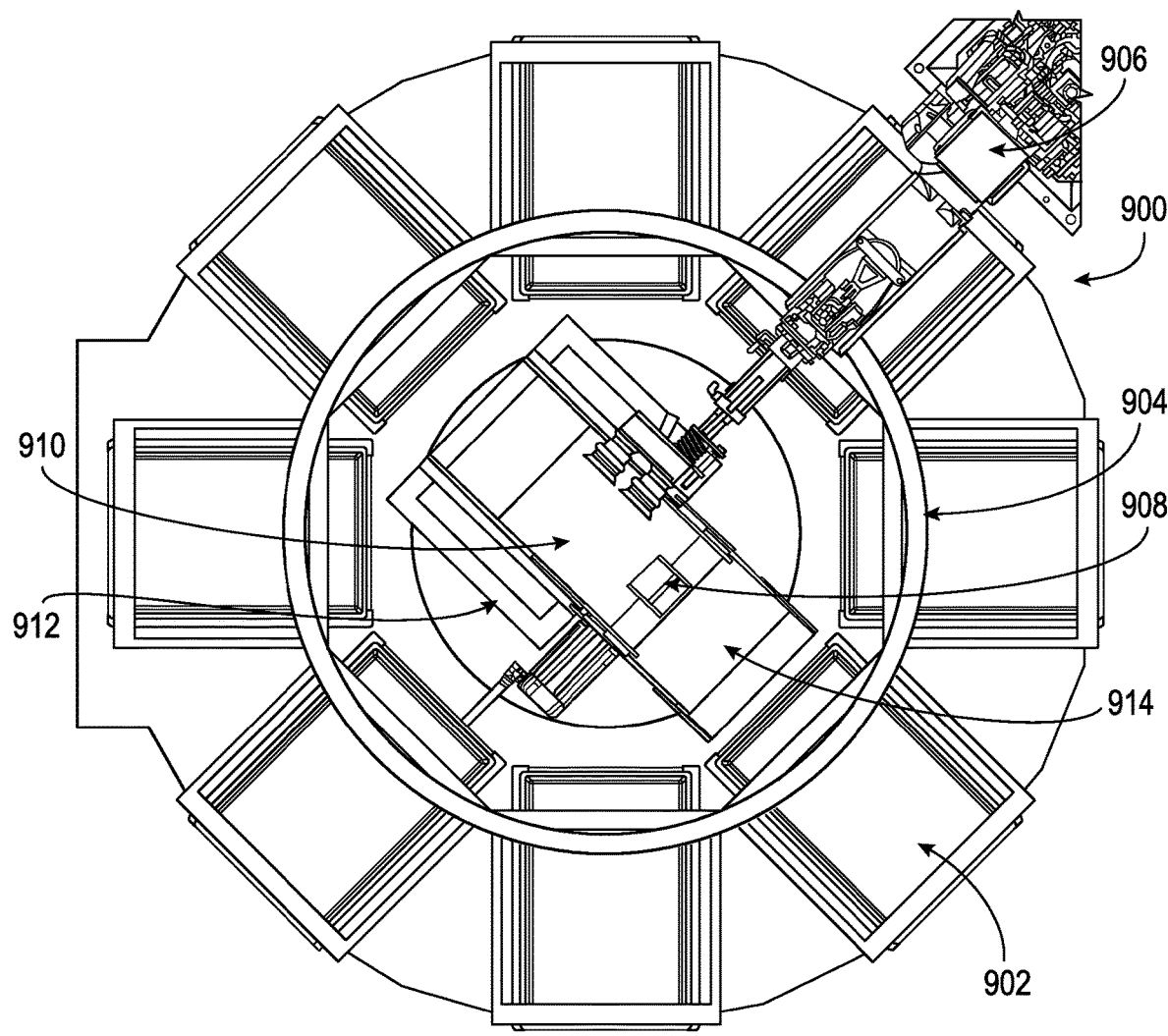
FIGS. 9A-9F illustrate movement of an item from a collection chute of an internal vertical reciprocating conveyor to a designated tote of the plurality of totes of the rotary put wall carousel, according to one or more embodiments described herein.

FIG. 9A illustrates that the item 908 can be picked by a robotic device 906 and placed in the collection chute 910 of the internal vertical reciprocating conveyor (VRC) 912. The dumper chute 914 can be actuated across the frame of the internal vertical reciprocating conveyor (VRC) 912 such that the dumper chute 914 can be positioned at the top of the internal vertical reciprocating conveyor (VRC) 912.

Figure 9B:
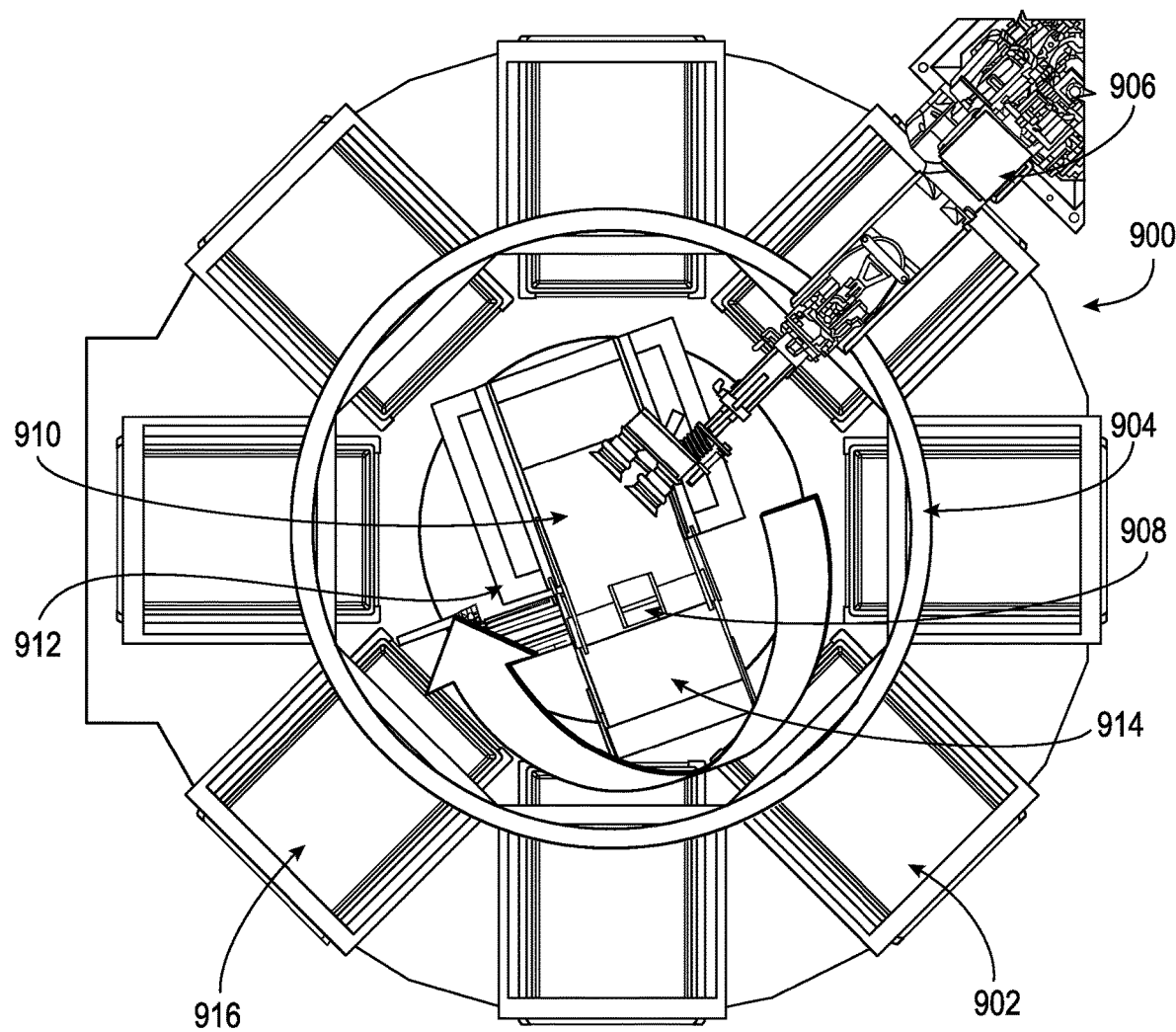

FIG. 9B illustrates that the collection chute 910 of the internal vertical reciprocating conveyor (VRC) 912 carrying the item 908 and the dumper chute 914 can be rotated about the axis of the internal vertical reciprocating conveyor (VRC) 912 to convey the item 908 to a designated put position.

Figure 9C:
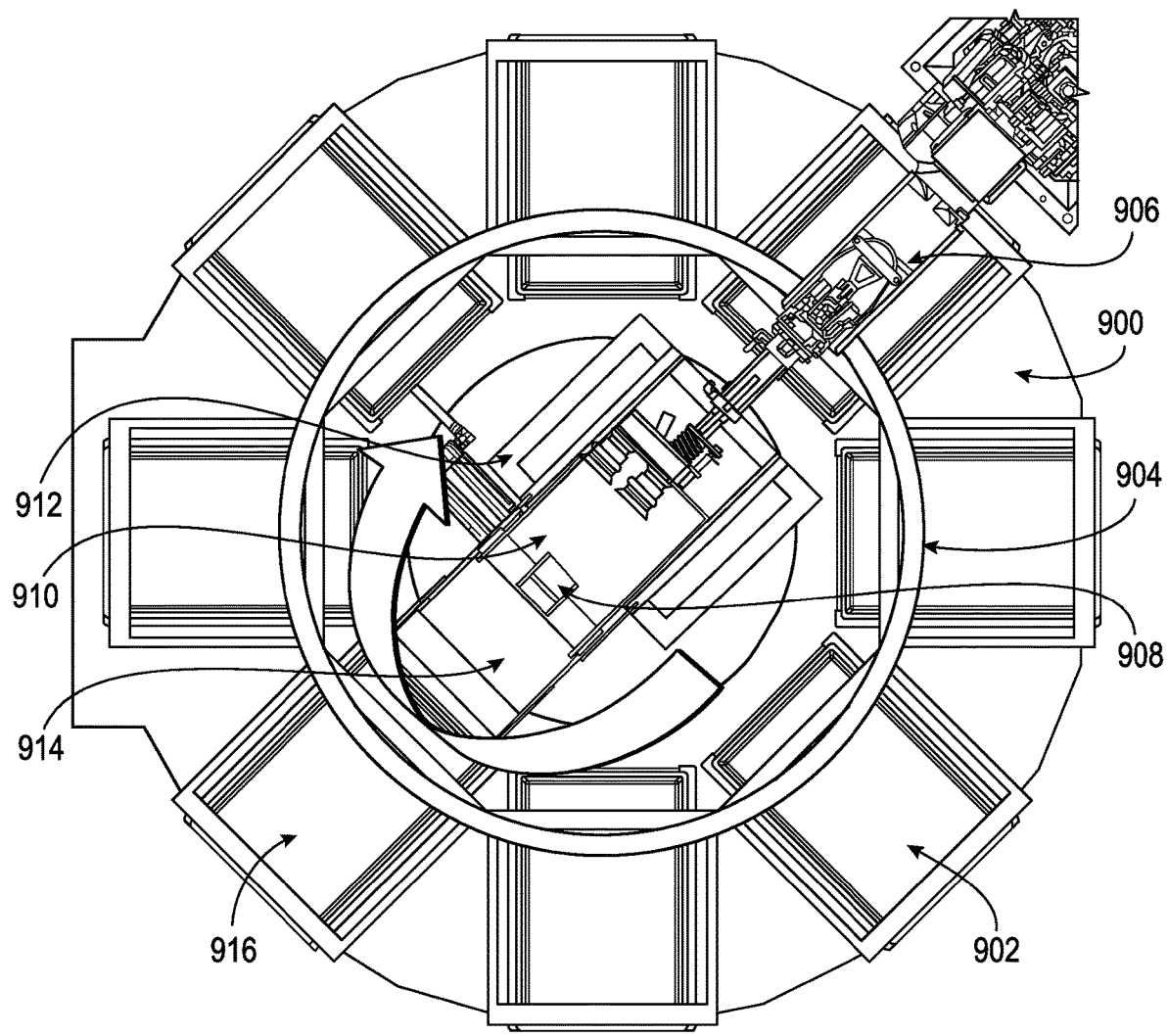

FIG. 9C illustrates that the collection chute 910 of the internal vertical reciprocating conveyor (VRC) 912 carrying the item 908 and the dumper chute 914 can be rotated about the axis of the internal vertical reciprocating conveyor (VRC) 912 to convey the item 908 towards a designated tote 916 at the designated put position.

Figure 9D:
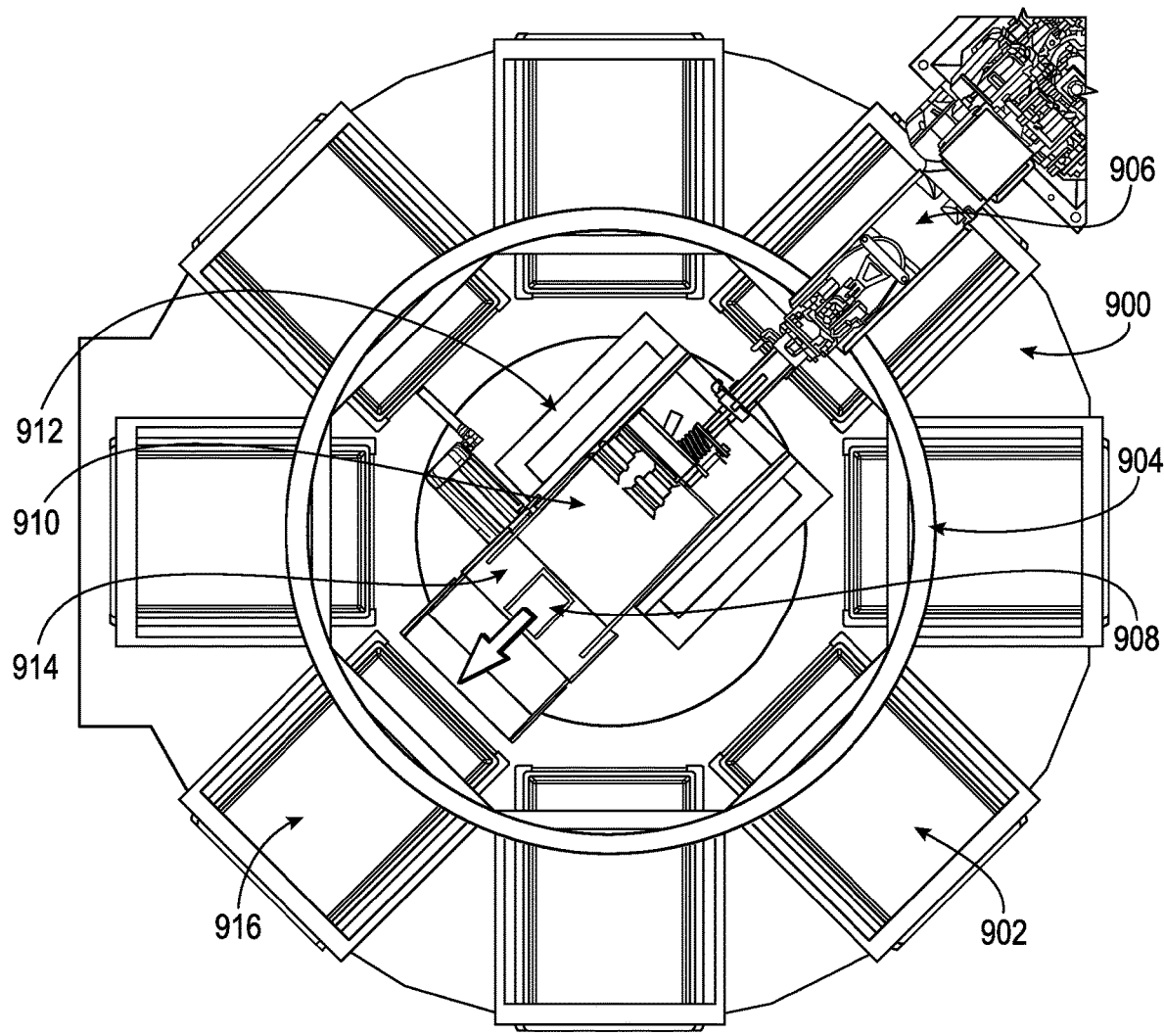

FIG. 9D illustrates that the collection chute 910 of the internal vertical reciprocating conveyor (VRC) 912 carrying the item 908 can release the item 908 into the dumper chute 914 of the internal vertical reciprocating conveyor (VRC) 912 to convey the item 908.

Figure 9E:
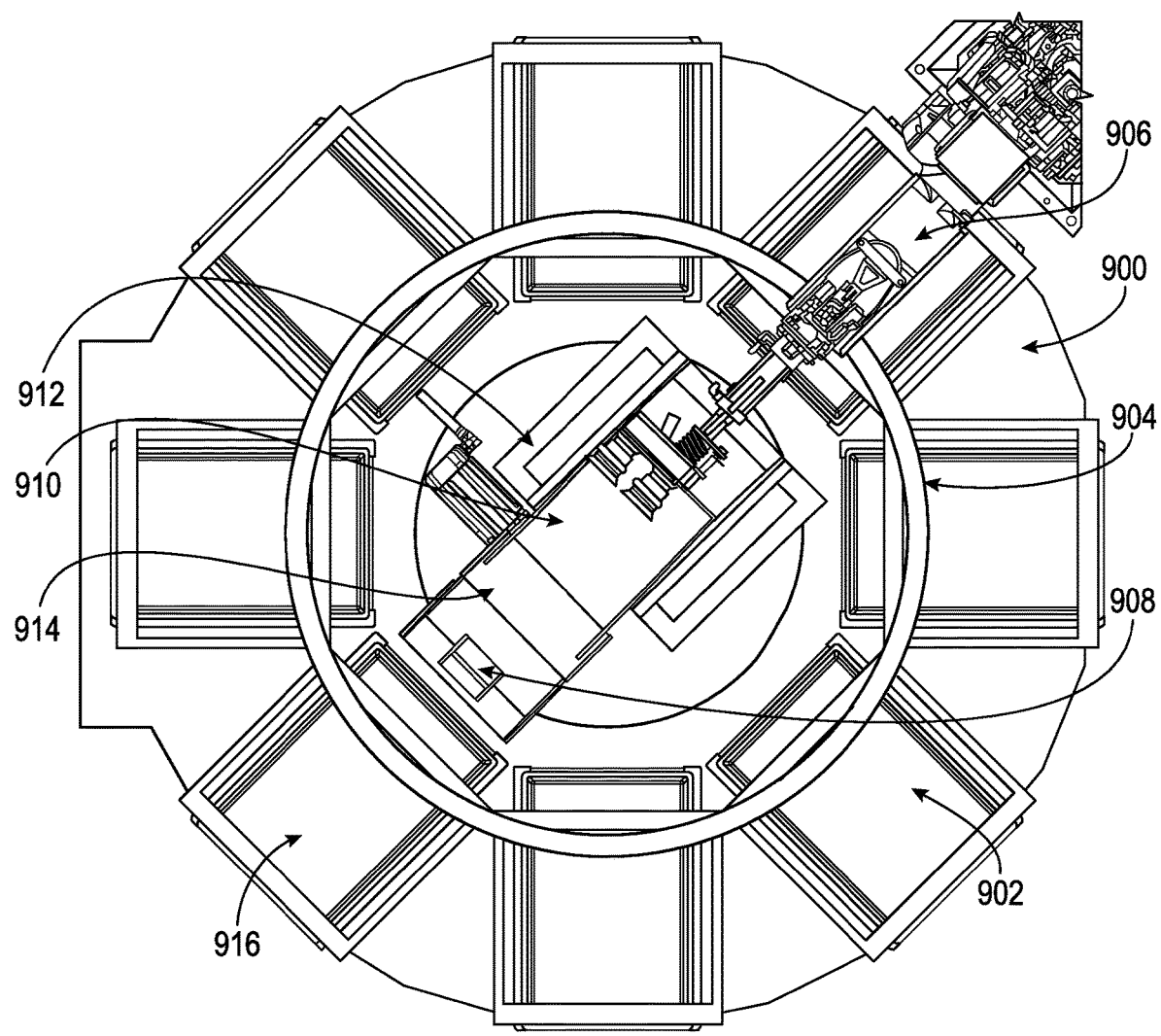

FIG. 9E illustrates that the dumper chute 914 of the internal vertical reciprocating conveyor (VRC) 912 carrying the item 908 can release the item 908 into the tote 916 of the plurality of totes of the internal vertical reciprocating conveyor (VRC) 912.

Figure 9F:
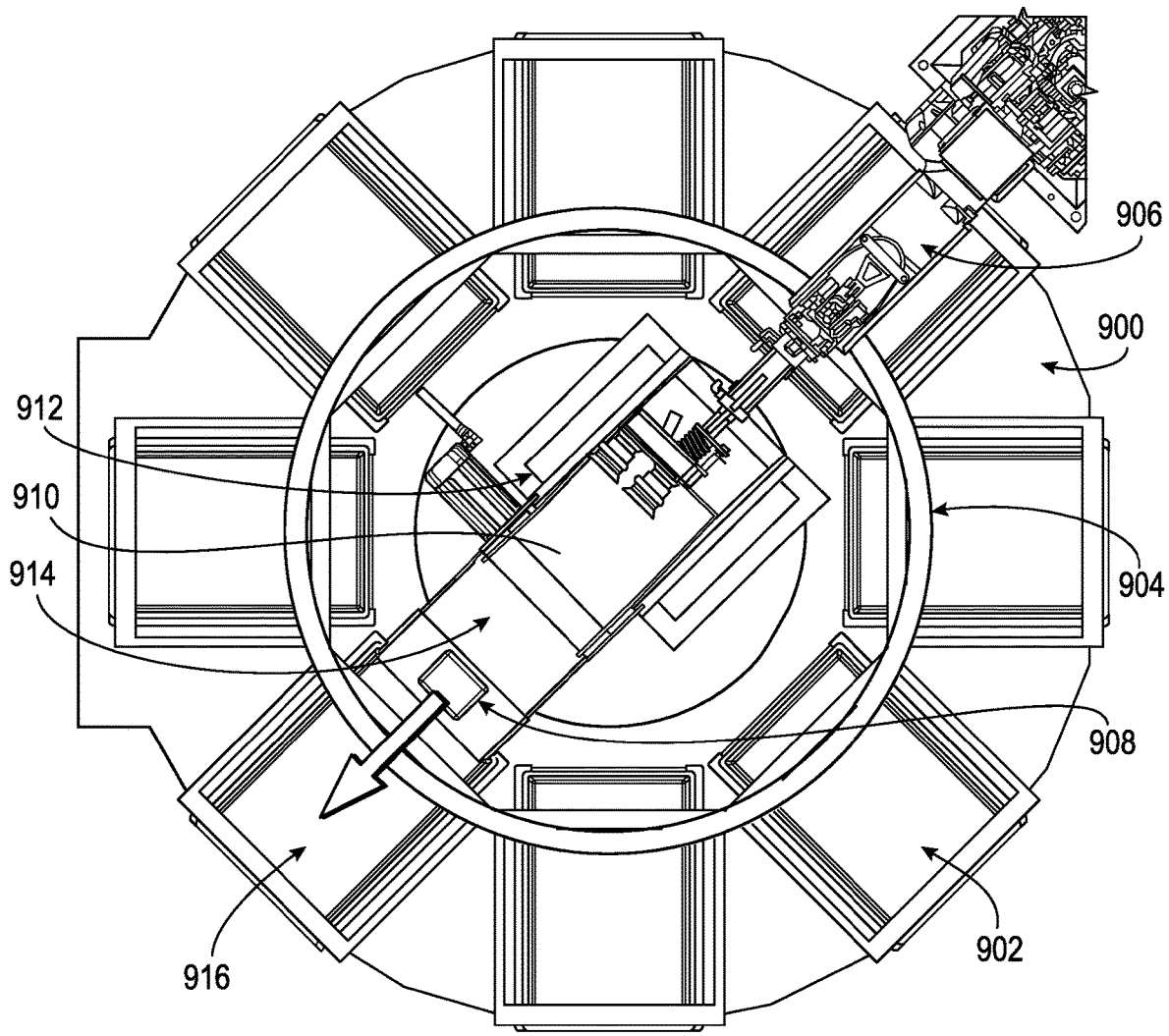

FIG. 9F illustrates that the item 908 can be released in the designated tote 916 by the dumper chute 914 of the internal vertical reciprocating conveyor (VRC) 912.

In some embodiments, sensors, such as proximity sensors, photo eye, and camera can be attached to the internal vertical reciprocating conveyor (VRC) 912 to monitor the position of the item in different operating positions as the item is picked by the first robotic device 906 and placed in the designated tote 916 of the rotary put wall carousel 904.

Figure 10:
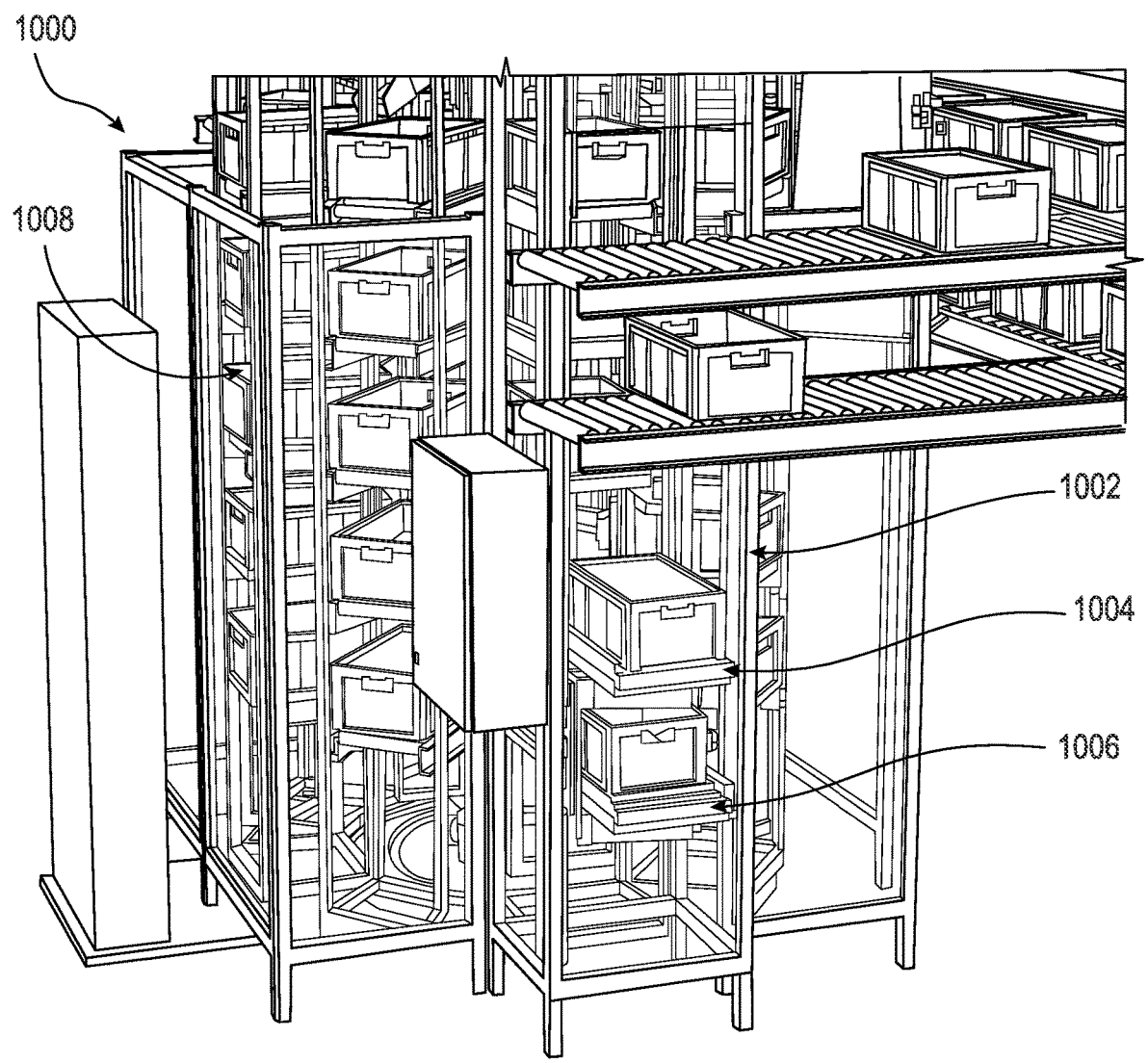
FIG. 10 illustrates an exemplary perspective view of a double-layered shelf of an external vertical reciprocating conveyor of a rotary put wall carousel.

FIG. 10 illustrates an exemplary perspective view of an external vertical reciprocating conveyor (VRC) 1002 of a rotary put wall carousel 1008. The external vertical reciprocating conveyor (VRC) 1002 can comprise a double-layered shelf comprising of an upper shelf 1004 and a lower shelf 1006 to transport totes carrying items from the rotary put wall carousel 1008.

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. An apparatus comprising:
a rotary put wall comprising a plurality of totes; and
a first vertical reciprocating conveyor placed within the rotary put wall, wherein the first vertical reciprocating conveyor comprises a frame and one or more chutes mounted to the frame, the one or more chutes configured to receive an item from a robotic device, and wherein the first vertical reciprocating conveyor is configured to rotate within the rotary put wall and is configured to convey the item into one tote of the plurality of totes, wherein the one or more chutes remain attached to the frame during rotation of the first vertical reciprocating conveyor.

2. The apparatus of claim 1, wherein the apparatus comprises a second vertical reciprocating conveyor, wherein the second vertical reciprocating conveyor is positioned external to the rotary put wall and wherein the second vertical reciprocating conveyor is configured to receive the item placed into the one tote of the plurality of totes and transport the item to an outfeed conveyor.

3. The apparatus of claim 2, wherein the second vertical reciprocating conveyor comprises two or more layers of shelves to receive the item.

4. The apparatus of claim 1, wherein the robotic device is a robotic manipulator.

5. The apparatus of claim 1 comprising the rotary put wall, wherein the rotary put wall is a modular rotary put wall.

6. The apparatus of claim 1, wherein the first vertical reciprocating conveyor has a collection chute mounted at a top portion of the first vertical reciprocating conveyor to receive the item from the robotic device.

7. The apparatus of claim 1, wherein the first vertical reciprocating conveyor has a dumper chute to transport the item to the one tote of the plurality of totes present in the rotary put wall.

8. The apparatus of claim 2, wherein the first vertical reciprocating conveyor and the second vertical reciprocating conveyor have a plurality of sensors to detect a position of the item placed in the one tote of the plurality of totes of the rotary put wall.

9. An apparatus, comprising:
a rotatable put wall having an internal cavity, the rotatable put wall comprising a plurality of totes;
a first device configured to pick an item from a first tote and a second device, wherein
the second device is placed within the internal cavity of the rotatable put wall, and configured to:
rotate within the rotatable put wall, and
place the item into one tote of the plurality of totes, wherein the one or more chutes remain attached to the second device during rotation of the second device.

10. The apparatus of claim 9, wherein a third device configured to pick the item from the one tote of the plurality of totes and place the item on an outfeed conveyor.

11. The apparatus of claim 9, wherein the item is placed in an empty tote of a plurality of empty totes on an outfeed conveyor.

12. The apparatus of claim 9, wherein the first device is a robotic manipulator.

13. The apparatus of claim 9, wherein the second device is one of a robotic manipulator and a vertical reciprocating conveyor.

14. The apparatus of claim 10, wherein the third device is one of a robotic manipulator and a vertical reciprocating conveyor.

15. The apparatus of claim 9, wherein the first device is configured to pick the item from the first tote placed on an upper conveyor of a conveyor system, wherein the conveyor system comprises the upper conveyor and a lower conveyor.

16. A method of conveying items comprising the steps of:
receiving an item from a first robotic device;
conveying the received item into a chute of one or more chutes of a second robotic device, wherein the second robotic device rotates with respect to a rotary put wall, and wherein the rotary put wall is configured to rotate with respect to second the robotic device, and wherein the rotary put wall has a plurality of totes; and
placing the conveyed item from the chute of the one or more chutes into one tote of the plurality of totes, wherein the chute of the one or more chutes remain attached to the second robotic device during rotation of the second robotic device and during placing the conveyed item into the tote of the plurality of totes.

17. The method of claim 16, wherein the second robotic device is a first vertical reciprocating conveyor.

18. The method of claim 16, wherein the first robotic device is a robotic manipulator.

19. The method of claim 16, wherein a second vertical reciprocating conveyor is positioned external to the rotary put wall and is further configured to receive the item placed into the one tote of the plurality of totes of the rotary put wall and transport the item to an outfeed conveyor.

20. The method of claim 19, wherein the item is placed in an empty tote of a plurality of empty totes on the outfeed conveyor.

* * * * *